US010895972B1

(12) United States Patent
Apostolatos et al.

(10) Patent No.: US 10,895,972 B1
(45) Date of Patent: Jan. 19, 2021

(54) OBJECT TIME SERIES SYSTEM AND INVESTIGATION GRAPHICAL USER INTERFACE

(71) Applicant: Palantir Technologies Inc., Palo Alto, CA (US)

(72) Inventors: Anton Apostolatos, New York, NY (US); Pedro Sanzovo, Sao Paulo (BR); Francis Chen, New York, NY (US); John McRaven, New York, NY (US); Miranda Luna, Seattle, WA (US); Sahiba Sachdeva, Washington, DC (US); Xavier Falco, London (GB)

(73) Assignee: PALANTIR TECHNOLOGIES INC., Denver, CO (US)

( * ) Notice: Subject to any disclaimer, the term of this patent is extended or adjusted under 35 U.S.C. 154(b) by 0 days.

(21) Appl. No.: 16/366,856

(22) Filed: Mar. 27, 2019

Related U.S. Application Data

(60) Provisional application No. 62/660,734, filed on Apr. 20, 2018.

(51) Int. Cl.
*G06F 3/0484* (2013.01)
*G06F 16/26* (2019.01)
*G06T 11/20* (2006.01)

(52) U.S. Cl.
CPC .......... *G06F 3/04847* (2013.01); *G06F 16/26* (2019.01); *G06T 11/206* (2013.01); *G06T 2200/24* (2013.01)

(58) Field of Classification Search
CPC .................................................. G06F 3/04847
(Continued)

(56) References Cited

U.S. PATENT DOCUMENTS 5,717,869 A * 2/1998 Moran ................. G11B 27/34
715/716
7,113,190 B2 * 9/2006 Heaton ................ G06T 11/206
345/440
(Continued)

FOREIGN PATENT DOCUMENTS

| EP | 3101560 | 12/2016 |
| EP | 3557436 | 10/2019 |
| WO | WO 2013/086610 | 6/2013 |

OTHER PUBLICATIONS

U.S. Appl. No. 16/387,392, Object Time Series System, filed Apr. 17, 2019.
(Continued)

*Primary Examiner* — Reza Nabi
(74) *Attorney, Agent, or Firm* — Knobbe, Martens, Olson & Bear LLP

(57) ABSTRACT

Methods and systems for presenting time series for analysis. A method includes presenting a first visualization of summary information for an initial data set of a plurality of batches, presenting a filtered data set of the initial data set having a first batch identifier associated with a first batch and the second batch identifier associated with a second batch, executing a time series connector including transmitting a request to a time series application, the request comprising the first batch identifier, the second batch identifier, and the time series configuration data. The method further includes causing presentation of a user interface comprising a chart including a first plot for first time series data for the first batch identifier and a second plot for second time series data for the second batch identifier, the chart configured to the time series configuration data, and the first plot is aligned to the second plot.

19 Claims, 10 Drawing Sheets

(58) Field of Classification Search
USPC .................................................... 715/771
See application file for complete search history.

(56) References Cited

U.S. PATENT DOCUMENTS

| | | | | |
|---|---|---|---|---|
| 7,667,582 B1* | 2/2010 | Waldorf | | G06T 11/206 340/440 |
| 7,840,937 B1* | 11/2010 | Chiluvuri | | G06F 8/36 717/106 |
| 7,961,188 B2* | 6/2011 | Tolle | | G06T 11/001 345/440 |
| 8,520,000 B2* | 8/2013 | Duncker | | G06F 40/186 345/440 |
| 8,966,392 B2* | 2/2015 | Antony | | G05B 23/024 715/781 |
| 9,041,716 B2* | 5/2015 | Ogles | | G05B 19/409 345/440 |
| 2002/0063733 A1* | 5/2002 | Franke | | G06Q 40/04 715/739 |
| 2002/0156806 A1* | 10/2002 | Cox | | G06F 40/166 715/202 |
| 2005/0232055 A1* | 10/2005 | Couckuyt | | G06T 11/206 365/227 |
| 2007/0126736 A1* | 6/2007 | Tolle | | G06T 11/001 345/440 |
| 2007/0203945 A1* | 8/2007 | Louw | | G06Q 30/02 |
| 2007/0245238 A1* | 10/2007 | Fugitt | | G06F 3/0481 715/700 |
| 2008/0109740 A1* | 5/2008 | Prinsen | | G06F 3/0486 715/764 |
| 2008/0134059 A1* | 6/2008 | Kumar | | G06F 9/451 715/760 |
| 2008/0195930 A1* | 8/2008 | Tolle | | G06F 40/18 715/227 |
| 2010/0005411 A1* | 1/2010 | Duncker | | G06F 3/0482 715/769 |
| 2010/0058250 A1* | 3/2010 | Stannard | | G06F 40/166 715/856 |
| 2010/0214299 A1* | 8/2010 | Robertson | | G06T 11/206 345/440 |
| 2010/0251128 A1* | 9/2010 | Cordasco | | H04L 67/125 715/736 |
| 2010/0283606 A1* | 11/2010 | Tsypin | | G05B 15/02 340/540 |
| 2011/0041087 A1* | 2/2011 | Leveille | | G06F 3/0486 715/765 |
| 2013/0066882 A1* | 3/2013 | Westbrooke | | G06F 16/2477 707/746 |
| 2017/0164580 A1* | 6/2017 | Rettedal | | G06F 3/0482 |
| 2019/0171775 A1* | 6/2019 | Martin | | G06F 16/901 |
| 2019/0325624 A1* | 10/2019 | McRaven | | G06F 16/367 |

OTHER PUBLICATIONS

Ratanamahatana et al., "Mining Time Series Data", Data Mining and Knowledge Discovery Handbook, Jul. 7, 2010, pp. 1-36.
Official Communication for European Patent Application No. 19170253.9 dated Aug. 19, 2019.

* cited by examiner

OBJECT TIME SERIES SYSTEM AND INVESTIGATION GRAPHICAL USER INTERFACE

TECHNICAL FIELD

The present disclosure relates to systems and techniques for data integration, visualization, and analysis. More specifically, this disclosure relates to providing a time-series query and investigation user interface.

BACKGROUND

Sensor systems monitoring processes or operations of a system can collect time series data, which may include numerous sensed data samples and a corresponding time indication of when each data sample was collected. Time series data may be related to a number of characteristics and properties, for example, including temperature, pressure, pH, light, infrared (IR), ultraviolet (UV), acceleration, dissolved oxygen, optical clarity, $CO^2$, motion, rotational motion, vibration, sound, voltage, current, capacitance, electromagnetic radiation, altitude, fluid flow, radiation, optical, and moisture, proximity and the like. In different contexts, the collection of the time series data from a plurality of sensors can correspond a discrete grouping of events (or a batch) such as a trip or segment of a trip (e.g., sensors on a vehicle during a trip), a chemical reaction in a plant or factory, or a product assembly in a factory.

From the perspective of sensors gathering time series data, there may not be a concept of a discrete grouping of events in the time series data but rather a large stored data set that has the all of the time series data from a sensor lumped together. Furthermore, time series data set can be large, unwieldy to analyze and difficult to compare.

SUMMARY

Embodiments of systems and methods of a time-series interaction user interface are disclosed herein. Time series data can be stored according to an object-orientated model in a grouping of any events, which may be referred to as a "batch," which as used herein may refer to any process, system or thing that can be monitored using at least one sensor to collect time series data. The object-orientated model for each batch may include properties indicative of a start and stop time (and/or date) of the batch, and multiple time series associated with each batch. For example, multiple time series sensor data, and/or corresponding quality data and determined information associated with each batch. The object-orientated model allows the user interface to display and allow user interaction with identified portions of time series sensor data and other corresponding information, from different batches.

A user can interact with a user interface that allows a user to perform sequential filtering and transformations on batches and batch-related data in a visual manner such that each transformation is shown sequentially down a user interface page. Using the board user interface a user can identify good and bad batches for further investigation in a time series user interface. The board user interface can include a connector to the time series user interface, which allows the user to select batch numbers and particular processes that the user is interested in. The connector automatically generates configuration data that is sent to the time series user interface. Further, a user can interact with a user interface and workflow to investigate good and bad batches and identify causes of the good and bad batches. In the workflow user interface, a first step and user interface includes identifying good and bad batches through quality metric filtration. A second step and user interface includes analyzing correlation data of the filtered quality metrics with other metrics to test a hypothesis regarding good and bad batches. A third step and user interface includes operationalizing the insights from the first two steps to review plant details. At any point through the workflow a user can open a time series user interface to compare and contrast batches.

The time series user interface supports object-orientated time series. The time-series data can be stored according to an object-orientated model in a grouping of events, such as batches. The object-orientated model for each batch includes properties such as a start and stop time, and multiple time series associated with each batch, such as multiple time series sensor data associated with each batch. The time-series query user interface can receive particular batches, such as batch identifiers, and automatically construct queries and user interfaces for the batches using the object-orientated model. In particular, for a received batch identifier or grouping of batch identifies and batch type, a data model can be retrieved that specifies the start and stop times for the time series and which time series (e.g., for particular sensors) should be retrieved. The time series user interface system can then automatically construct the time series user interfaces according to the data model and the retrieved time series data. For example, using the start and stop times for multiple time series for the same batch type, the system can automatically time shift each of the respective time series so a user can compare and contrast multiple batches at the same time. The solution can be faster and more accurate than a person manually setting up the time series user interfaces and reduces the mental strain on the user to setup such user interfaces.

In one innovation, an embodiment of a method for presenting time series includes causing presentation of a first visualization for an initial data set, the first visualization comprising summary information of a plurality of batches, receiving user input comprising a first filter parameter, applying the filter parameter to the initial data set, where applying the first filter parameter includes generating a filtered data set from the initial data set, and causing presentation of at least some entries of the filtered data set comprising a first batch identifier associated with a first batch and the second batch identifier associated with a second batch. The method further includes receiving a user selection to execute a time series connector for at least the first batch identifier and the second batch identifier and a batch process, where the time series connector is configured to generate time series configuration data for the batch process, and executing the time series connector, where executing the time series connector further includes transmitting a request to a time series application, the request comprising the first batch identifier, the second batch identifier, and the time series configuration data. The method may further include causing presentation, in the time series application, of a time series user interface based at least on the request, the time series user interface comprising a chart, the chart comprising a first plot for first time series data for the first batch identifier and a second plot for second time series data for the second batch identifier, where the chart is further configured according to the time series configuration data, and where the first plot is aligned and comparable to the second plot. The method is performed by one or more computer hardware processors configured to execute computer-executable instructions on a second non-transitory computer storage medium.

In an embodiment of the method, the time series connector comprises an association of a process that is related to a batch to time series sensor data for two or more sensors. In an embodiment of the method, the first time series data of the first plot is related to a first physical characteristic sensed from the first batch, and the second time series data of the second plot is related to the first physical characteristic sensed from the second batch. In an embodiment of the method, the chart further includes a third plot for the first time series data for the first batch identifier, and a fourth plot for the second time series data for the second batch identifier, where the first time series data of the third plot is related to a second physical characteristic sensed from the first batch, and the second time series data of the fourth plot is related to the second physical characteristic sensed from the second batch.

In an embodiment of the method, the first plot and the second plot for the first physical characteristic are depicted in a first graph defined by an first X and Y axis, and the third plot and the fourth plot for the second physical characteristic are depicted in a second graph defined by a second X and Y axis, wherein the Y axes of the first graph and the second graph are illustrated to be in parallel in the chart. In an embodiment of the method, the summary information includes first information for each of the plurality of batches in the first visualization, and wherein applying the first filter parameter comprises generating the filtered data set from the initial data set based on applying the first filter parameter to the first information for each of the plurality of batches. In an embodiment of the method, the user input includes a second filter parameter, and where generating a filtered data set includes applying the second filter parameter to the filtered data set generated by applying the first filter parameter to generate a filtered data set filtered by the first and second filter parameter.

In an embodiment of the method, the method further includes receiving a user input comprising a graphical parameter, applying the graphical parameter to the initial data set to generate a graphical summary representing at least some of the summary information for at least some of the plurality of batches, causing presentation of the graphical summary for analysis by the user. In an embodiment of the method, the graphical summary comprises a histogram. In an embodiment of the method, the graphical summary includes a plot representing a correlation of at least some of the summary information for at least some of the plurality of batches. In an embodiment of the method, the time series configuration data includes preconfigured information such that the presentation of a time series user interface based on the request causes the chart to include preconfigured time series data from multiple sensors for each batch represented in the chart.

Another innovation is a system for presenting time series includes a first non-transitory computer storage medium configured to store time series data and summary information for a plurality of batches, a second non-transitory computer storage medium configured to at least store computer-executable instructions, and one or more computer hardware processors in communication with the second non-transitory computer storage medium, the one or more computer hardware processors configured to execute the computer-executable instructions to at least cause presentation of a first visualization for an initial data set, the first visualization comprising summary information of a plurality of batches, receive user input comprising a first filter parameter, apply the filter parameter to the initial data set, wherein applying the first filter parameter comprises generating a filtered data set from the initial data set, cause presentation of at least some entries of the filtered data set comprising a first batch identifier associated with a first batch and the second batch identifier associated with a second batch, and receive a user selection to execute a time series connector for at least the first batch identifier and the second batch identifier and a batch process, the time series connector is configured to generate time series configuration data for the batch process. The one or more computer hardware processors are further configured to execute the computer-executable instructions to at least execute the time series connector, executing the time series connector further including transmitting a request to a time series application, the request comprising the first batch identifier, the second batch identifier, and the time series configuration data, and causing presentation, in the time series application, of a time series user interface based at least on the request, the time series user interface comprising a chart, the chart comprising a first plot for first time series data for the first batch identifier and a second plot for second time series data for the second batch identifier, wherein the chart is further configured according to the time series configuration data, and wherein the first plot is aligned and comparable to the second plot. In an embodiment of the system, the time series connector may include an association of a process that is related to a batch to time series sensor data for two or more sensors.

In an embodiment of the system, the first time series data of the first plot is related to a first physical characteristic sensed from the first batch, and the second time series data of the second plot is related to the first physical characteristic sensed from the second batch. In an embodiment, the chart further comprises a third plot for the first time series data for the first batch identifier, and a fourth plot for the second time series data for the second batch identifier, and wherein the first time series data of the third plot is related to a second physical characteristic sensed from the first batch, and the second time series data of the fourth plot is related to the second physical characteristic sensed from the second batch. In an embodiment, the first plot and the second plot for the first physical characteristic are depicted in a first graph defined by an first x-axis and a y-axis, and the third plot and the fourth plot for the second physical characteristic are depicted in a second graph defined by a second x-axis and y-axis, wherein the y-axes of the first graph and the second graph are illustrated to be in parallel in the chart. In an embodiment, the user input includes a second filter parameter, and wherein generating a filtered data set includes applying the second filter parameter to the filtered data set to generate a filtered data set filtered by the first and second filter parameter. In an embodiment, the system one or more processors can receive a user input comprising a graphical parameter, and apply the graphical parameter to the initial data set to generate a graphical summary representing at least some of the summary information for at least some of the plurality of batches, causing presentation of the graphical summary for analysis by the user. A graphical summary may include a plot representing a correlation of at least some of the summary information for at least some of the plurality of batches.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, the design of computer user interfaces that are useable and easily learned by humans is a non-trivial problem for software developers. The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-series data and may enable a user to more quickly access, navigate, assess, and digest such information than previous systems.

Data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, averages, correlations, and other statistical information. For example, when summary information of an initial data set of batch data is presented in a user interface for display, portions of the summary information may be presented in histogram form or another type of chart, to facilitate the user recognizing certain features of the summary information.

In an example, summary information of an initial time series data set of batch data may be filtered in accordance with user input, and the filtered results displayed, such that certain portions of the data can be down selected from the initial data set. The down selecting of the data can be done to further analyze batches that are "low performers" of "high performers" in accordance with a user selected criteria. In some examples, the user selected criteria is a quality data metric determined for the batch after time series data has been collected for the batch, for example, at the end of the last event in a plurality of events of a batch. The down selecting the data could also be done based on filtering of initial data set is provided by one or more user input filtering parameters. For example, of a certain sensed data point, for example, a high data point or low data point. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described herein in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Technical Problem

Figure 1:
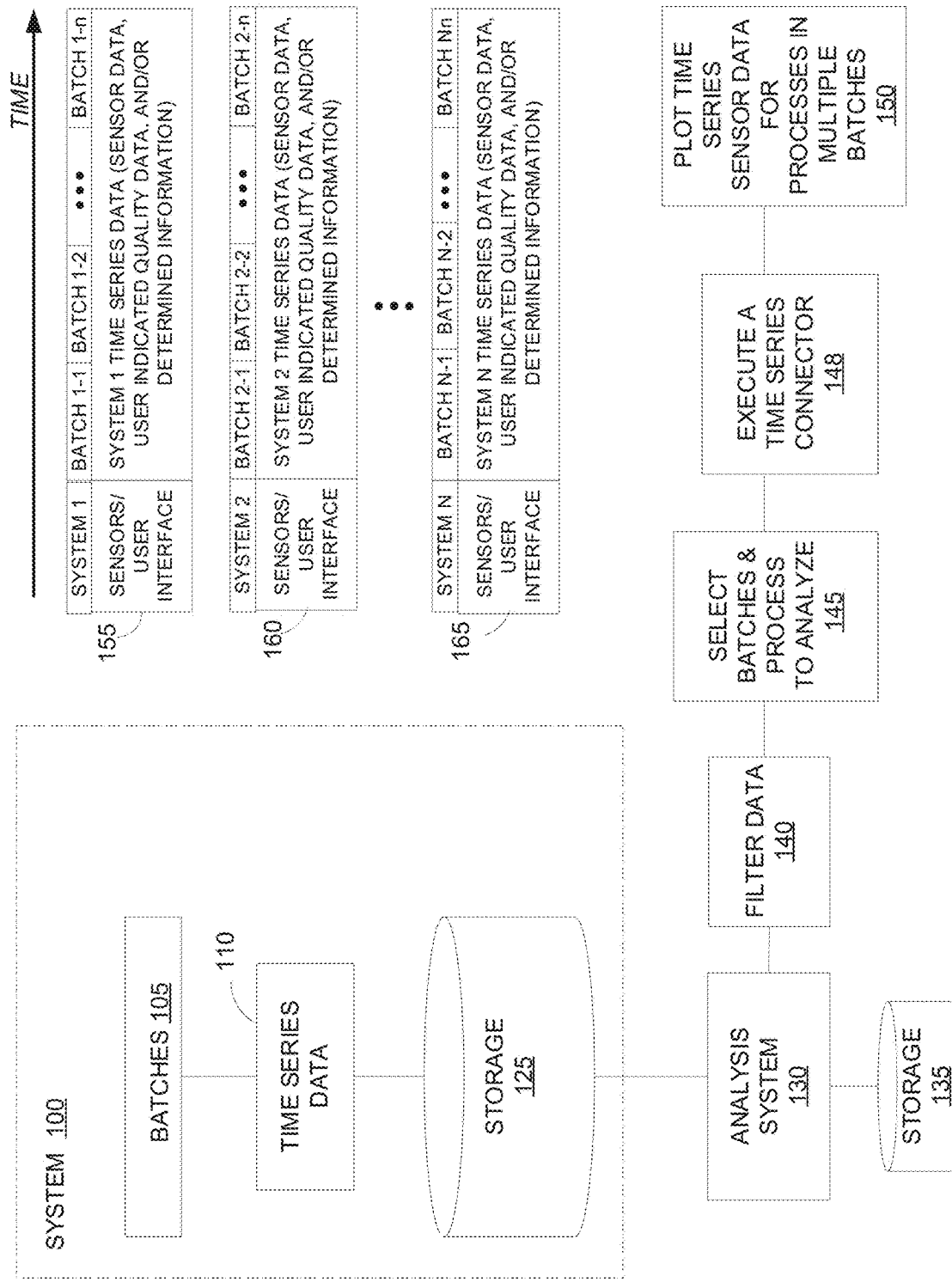
FIG. 1 illustrates an example of a schematic of an overview of collecting, storing data in a data store, filtering the data, selecting a process or event to analyze, displaying corresponding time series data for one or more sensors in multiple batches in a user interface.

Sensors can collect time series data. In particular, sensor systems monitoring processes or operations of a system can collect time series data, which may include numerous sensed data samples and a corresponding time indication of when each data sample was collected. In different contexts, the collection of the time series data from sensors can correspond to a discrete grouping of events (or batch) such as chemical reactions for food processing, a trip or segment of a trip (e.g., sensors on a vehicle during a trip), a chemical reaction in a plant or factory, sensor data for a piece of machinery (e.g., industrial equipment or a home water heater), or a product assembly in a factory. In a food processing example, raw materials may go through a series of steps (where sensors can record metrics around each step of the process such as temperature and moisture) to be transformed into an end product; these series of steps can be repeated many times for multiple batches of end products. However, from the perspective of sensors gathering time series data, there may not be a concept of a discrete grouping of events in the time series data but rather a large stored data set that has the all of the time series data from a sensor lumped together. Furthermore, time series data set can be large, unwieldy to analyze and difficult to compare.

A user may be interested in answers to the following questions: What are good batches? What are time series metrics associated with the good batches? What are bad batches? What are time series metrics associated with the bad batches? What do the series metrics from bad batches look like compared to the metrics from good batches? What caused the good batches? What caused the bad batches? Further, user interfaces to view and compare the time series data in grouping of events (or batches) can be manually set up by a user. However, such manual setup by a user using the time series user interface is a slow and tedious process for a user.

Solution

A user can interact with a user interface that allows a user to investigate batches and batch-related data. For example, a user can interact with a "board" user interface that allows a user to perform sequential filtering and transformations on batches and batch-related data in a visual manner such that each transformation is shown sequentially on a user interface page. Using the board user interface a user can identify good and bad batches for further investigation in a time series user interface. The board user interface can include a connector to the time series user interface, which allows the user to select batch numbers and particular processes that the user is interested in. The connector automatically generates configuration data that is sent to the time series user interface. Further, a user can interact with a user interface and workflow to investigate good and bad batches and identify causes of the good and bad batches. In the workflow user interface, a first step and user interface includes identifying good and bad batches through quality metric filtration. A second step and user interface includes analyzing correlation data of the filtered quality metrics with other metrics to test a hypothesis regarding good and bad batches. A third step and user interface includes operationalizing the insights from the first two steps to review plant details. At any point through the workflow a user can open a time series user interface to compare and contrast batches.

The time series user interface supports object-orientated time series processing to view summaries of time series data and select certain portions of time series data for displaying graphically to facilitate analysis of the data. The time-series data can be stored according to an object-orientated model in a grouping of events, such as batches. The object-orientated model for each batch includes properties such as a start and stop time, and multiple time series associated with each batch, such as multiple time series sensor data associated with each batch. The time-series query user interface can receive particular batches, such as batch identifiers, and automatically construct queries and user interfaces for the batches using the object-orientated model. In particular, for a received batch identifier or grouping of batch identifies and batch type, a data model can be retrieved that specifies the start and stop times for the time series and which time series (e.g., for particular sensors) should be retrieved. The time series user interface system can then automatically construct the time series user interfaces according to the data model and the retrieved time series data. For example, using the start and stop times for multiple time series for the same batch type, the system can automatically time shift each of the respective time series so a user can compare and contrast multiple batches at the same time. The solution can be faster and more accurate than a person manually setting up the time series user interfaces and reduces the mental strain on the user to setup such user interfaces. Additional details regarding a time series user interface that supports object-orientated time series and/or a data model can be found in U.S. patent application Ser. No. 16/387,392, entitled "OBJECT TIME SERIES SYSTEM AND GRAPHICAL USER INTERFACE," filed on Apr. 17, 2019, which is incorporated by reference herein in its entirety.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium, component, and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a batch (see below), a sensor, a person, a place, an organization, a market instrument, or other noun. A data object can represent an event or a group of events that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Batch Type, Sensor Type, Person, Event, or Document). Object types may be defined by an ontology and may be modified or updated to include additional object types. An object definition (e.g., in an ontology) may include how the object is related to other objects, such as being a sub-object type of another object type (e.g., a particular batch type can be associated with one or more other sensor types, or an agent may be a sub-object type of a person object type), and the properties the object type may have.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g. a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Batch: As used herein is a broad term that refers to something that changes over time and that can be monitored over time. In one example, a batch may refer to a physical entity that is subject to one or more related events (or processes) that cause changes to the physical entity. For example, a grouping of related events processes (or operations) which a physical entity goes through may comprise a batch. In some examples, the physical entity may be a material, a substance, a system, or a thing. In some examples, a batch may refer to any system that can be monitored as it operates over a period of time. One or more sensors can be used to monitor a batch, and/or one or more users can monitor a batch. In another example, a car driving from one point to another or for a certain duration can be referred to as a "batch" (referring to the thing being monitored over time, e.g., car). In such cases, the operation of a system to do something (e.g., heat water, refine oil, make food products) may be referred to as a "batch" (referring to the thing being monitored over time, e.g., the equipment). In another example, material (e.g., water, oil, produce) that changes, due to being operated on by a system or process, may also be referred to as a "batch" (referring to the thing being monitored over time, e.g., a series of events, a system, a material, and the like). In another example, a batch may refer to a baseball that is monitored for movement (e.g., as the baseball is hit by a bat). In some embodiments, a user can also monitor a batch and characterize the batch at one or more time instances over a period of time, e.g., characterize the quality of the batch, or how well the batch is operating. In some embodiments, additional information relating to the batch may be determined. For example, determined information may be generated by a combination of data from two or more sensors, or by taking a sample of the batch and performing quality analysis. In another example, determined information may be generated by a combination of data from one or more sensors and user input (e.g., a user input characterizing quality). A batch may be represented as a data object, or as a collection of data objects, where characteristics of the batch, (e.g., identification, start time, end time, time series data collected by each sensor, and the like) may be represented as a data object.

Event: An occurrence that takes place over a time period, where time series data can be collected during the occurrence. An event may have a start time and/or an end time, or at least an indicated (or identified) start time and/or end time. An event generally occurs at a location. For some events, the location may cover a large geographic area. For example, an earthquake, ocean tides, and a space station falling out of orbit are examples of events that may occur across a large geographic area, and including above and below the earth's surface. For some other events, the location may be at a specific place, for example, a factory, an office, a home, outside or at a business. For example, baking a cake, the operation of an autonomous vehicle on a route, the actuation of a valve in a cooling system, heating liquid in a container, a cutting operation on a piece of industrial equipment, a particular operation of a system (or machinery) in a facility, a lap of a motorcycle around a race track, and a homerun are examples of events that occur that can occur at a specific place. An event may be characterized by two or more portions that may be referred to as sub-events or phases of the event. In some examples, a batch may undergo a change during one or more events.

Time Series Data: A series of information referenced to time. For example, a series of information that is sensed, collected, determined, and/or stored over a period of time, such that the information may be referenced by the time that it was sensed, collected, determined, and/or stored. In one example, the series of information is generated by a sensor monitoring a characteristic, for example, temperature, pressure, pH, light or radiation, dissolved oxygen, carbon dioxide, gas composition, size, vibration, or movement. In another example, the series of information is determined by using data from one sensor and other information, for example, data from another sensor or stored data. In another example the series information is determined by a user's input, for example, where the user input is a quality characterization.

Object-Centric Data Model

FIG. 1 is a schematic showing an example of collecting, storing data, and displaying time series data corresponding to multiple batches in a user interface, such that certain time series data related to each batch is aligned to have the same relative start time for ease of comparison. The batches 105 in FIG. 1 may be anything that changes and that can be monitored over time (e.g., a system, a material, etc.). Batches 105 are monitored over time by system 100. Several types of information may be collected as the batches are subject to one or more various events. Time series sensor information 110 is collected by one or more sensors monitoring the batches. The time series information 110 can include sensed data for each sensor monitoring the batches 105, and time data (e.g., a timestamp) that corresponds to the sensed data to indicate when the sensed data was collected. For example, for every sensed data sample collected by each sensor, corresponding time information for the sensed data sample is also collected. The time information may include the date when the sensed data sample was collected and the time the sensed data sample was collected. In some examples, the time information is a timestamp that represents the hour, minute, seconds, and/or fractions of a second, when the sensed data sample was collected.

FIG. 1 also illustrates time series data 110 can also include quality information associated with the batches 105. The time series quality information may include time referenced input that a user makes relating to a condition of a batch. For example a user may make a visual observation of a batch and enter that data at the time the observation was made. In another example where the batch is a material, a user may draw a sample of a batch and perform one or more tests or processes on the sample to characterize a quality of the batch. Such quality characteristics may, include but is not limited to, a user observation based on a user's vision, hearing, smell, taste, or touch. In some instances, the quality information is based on the user's experience.

The time series data 110 may also include determined information relating to a batch. The time series determined information may include a time reference indicating when the determined information was made, and the determined information itself. The determined information may be based on two or more sources including, for example, time series sensor information of one or more sensors and/or time series user quality information. In some examples, sensor information from one or more sensors is used with a predetermined algorithm to generate the time series determined information. In some examples, time series determined information is generated using one or more sensors and previously stored information, for example, information on previously run batches.

Time series sensor data 110 may be stored in a storage component 125. In some examples storage component 125 is geographically located with the batches 105 in an information collection system 100. As further illustrated in FIG. 1, storage component 125 is in communication with analysis system 130, which may be co-located with storage component 125, or at another location. Analysis system 130 may be coupled to a storage component 135 which can be used to locally store any of the time series information for quicker access. Analysis system 130, may process time series sensor data 110 in accordance with one more data models, defined by an ontology, for storage of data in one or more databases, as further described in reference to FIGS. 2-5. Storing the time series information in a data model facilitates quickly accessing the time series information for certain time periods, and facilitates generating user interfaces comprising plots of the time series information to compare information, such as sensor data, from one or more batches.

FIG. 1 also illustrates that multiple batches may be on multiple systems, and time series data corresponding to the batches that can include sensor data, user input data, and information determined from inputs from one or more sources. In some examples of systems monitoring batches, multiple batches may be "run" in series on a system 155 (e.g., one after the other) such that the same sensors that are used to monitor and collect time series data for batch 1-1 are also used to monitor and collect time series data for batch 1-2, . . . , batch 1-n.

In other examples of systems monitoring batches, multiple batches may be run in parallel on each of multiple systems 155, 160, and 165. Multiple sensors for a first system 155 monitor and collect time series data for batch 1-1, batch 1-2, . . . , and batch 1-n. Multiple sensors multiple sensors for a second system 160 monitor and collect time series data for batch 2-1, batch 2-2, . . . , and batch 2-n. Multiple sensors multiple sensors for a third system 165 monitor and collect time series data for batch N-1, batch N-2, . . . , and batch N-n.

All of the collected time sensor data that is associated with systems 155, 160, and 165 can be stored in one or more databases in accordance with one or more data models, as described in more detail in reference to FIGS. 2-5 For example, time series data may be stored in a type of data object in accordance with an object definition that includes how the data is related to other objects. Data objects may be defined in various ways depending on a particular implementation to facilitate analyzing and comparing the generated time series data. For example, each of the batches may be stored as a data object that includes a batch identifier, the batch start time, the batch end time, and identifiers for one or more events that are associated with the batch. In another example, each time series data stream generated by a sensor may be stored as a data object, in such a data object may include a sensor identifier, a system identifier indicating what system the sensor is associated with, the sensed data generated by the sensor, and time information corresponding to the sensed data generated by the sensor. In another example, time series data that includes user indicated quality data may be stored as a data object that includes a batch identifier, a system identifier, quality data, and time information corresponding to the quality data provided by the user. In another example, time series data that includes determined information may be stored as a data object that includes a batch identifier, system identifier, quality data, and time information corresponding to the determined information.

Analysis system 130 may include user input devices that allow a user to identify certain sensor information of certain batches for display and analysis. For example, at block 140 time series data of an initial data set of batches may be filtered to a filtered data set, which is a subset of the batches in the initial data set, for comparison and analysis. User interface 140, for example, by event or by a time period. At block 145, a process of the batches in the filtered data set is identified by a user by selecting the process from a menu presented in a board user interface. The process is associated with time series sensor data collected during the process. At block 148, a time series connector for at least the first batch identifier and the second batch identifier and a batch process is executed by a user selection, the time series connector being configured to generate time series configuration data for the batch process, where executing the time series connector further includes transmitting a request to a time series application, the request comprising the first batch identifier, the second batch identifier, and the time series configuration data. At block 150, time series sensor data relating to the batches in the filtered data set is presented in a user interface on a display for comparison and analysis. The filtered data block 140, the selected process to analyze block 145, and the plot time series sensor data for processes in multiple batches block 150 are performed using user interfaces that are generated to easily and efficiently select desired portions of time series data for desired batches for analysis. These user interfaces, and storing the time series data in accordance with an ontology as described herein allow a user to investigate, compare, and analyze large amounts of time series data quickly and efficiently with little or no manual manipulation of the data itself.

In an implementation, the system 100 (or one or more aspects of the system 100) may comprise, or be implemented in, a "virtual computing environment". As used herein, the term "virtual computing environment" should be construed broadly to include, for example, computer readable program instructions executed by one or more processors (e.g., as described in the example of FIG. 7) to implement one or more aspects of the modules and/or functionality described herein. Further, in this implementation, one or more components of the system 100 may be understood as comprising one or more rules engines of the virtual computing environment that, in response to inputs received by the virtual computing environment, execute program instructions to modify operation of the virtual computing environment. For example, a request received from the user computing device 107 may be understood as modifying operation of the virtual computing environment to cause the request access to a resource from the system 100. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the system 100. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the system 100 as a virtual computing environment may advantageously enable executing different aspects or modules of the system on different computing devices or processors, which may increase the scalability of the system. Implementing one or more aspects of the system 100 as a virtual computing environment may further advantageously enable sandboxing various aspects, data, or modules of the system from one another, which may increase security of the system by preventing, e.g., malicious intrusion into the system from spreading. Implementing one or more aspects of the system 100 as a virtual computing environment may further advantageously enable parallel execution of various aspects or modules of the system, which may increase the scalability of the system. Implementing one or more aspects of the system 100 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Figure 2:
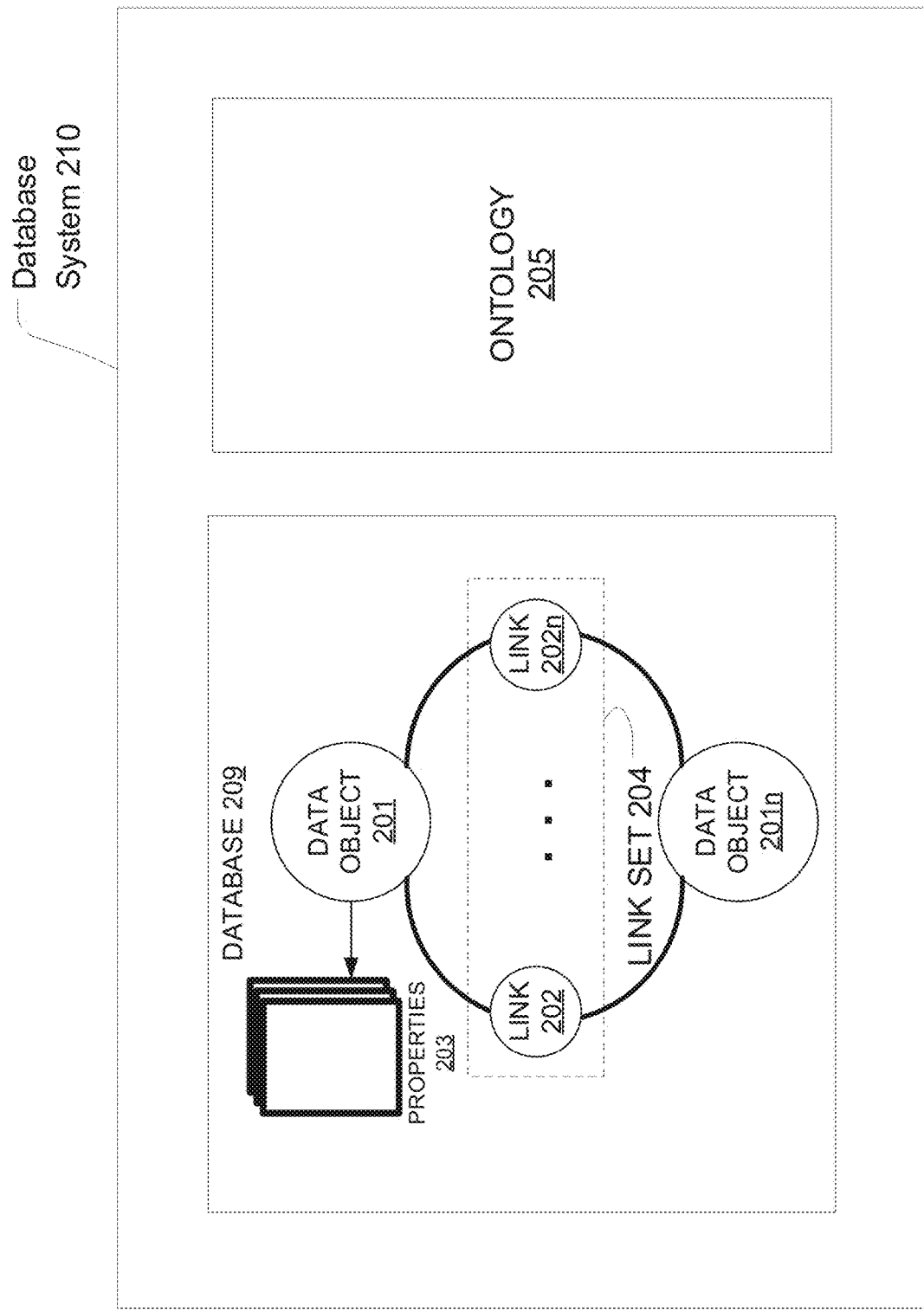
FIG. 2 illustrates one embodiment of a database system using an ontology.

FIG. 2 illustrates one embodiment of a database system using an ontology. An ontology may provide a data model for storage of time series data and information. To provide a framework for the discussion of specific systems and methods described herein, an example database system 210 using an ontology 205 will now be described in reference to FIG. 2. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

FIG. 2 also illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on 3/27/2009 (e.g., a property of type "date") may be stored in the database 209 as an event object with associated currency and date properties as defined by the ontology 205. In another example of an event object, a batch (e.g., an object of type "batch") in a process step or location in the process (e.g., a property of type "event") starting on 3/27/2009 (e.g., a property of type "date") at 0805:00 (e.g., a property of type "start time") and completing on 3/27/2009 (e.g., a property of type "date") at 1515:15 (e.g., a property of type "time") on (or monitored by) system 1 (e.g., a property type of "system"). In another example, a specific sensor (e.g., an object of type "sensor") used in a system (e.g., a property of type "system") can collect time series data (e.g., a property of type "data") along with times associated with the data (e.g., a property of type "time"). The data objects defined in the ontology 205 may support property multiplicity. In particular, a data object 201 may be allowed to have more than one property 203 of the same property type. For example, a "Person" data object might have multiple "Address" properties or multiple "Name" properties. In another example, a batch in a process run may have multiple "sensor" properties indicating that multiple sensors collected monitored the batch to collect time series data.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. In one embodiment, when two data objects are connected by an event, they may also be connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In another example, two "Batch" data objects representing two batches that were monitored by the same system may both have a "Sensor" property that indicates the sensor that was used to monitor each of the batches. If both batches were monitored by the same system (e.g., at different times), then both batches may have one or more "Sensor" properties that are likely similar, if not identical, indicating one or more of the same sensors were used to collect time series data for each of the batches. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). In another example of matching event properties, two or more batches can include one or more of the same event properties, which indicates the tool more batches have undergone the same event. Accordingly, by selecting a group of batches and selecting an event which is common to each batch in the group of batches, time series data for each of these batches may be displayed in a user interface in one or more plots such that it is temporally aligned for comparison. The time series data may include one or more time series sensor data. In an example, the temporal alignment of a first plot of time series data to a second plot of time series data aligns a portion of a first subset of time series data with a portion of a second subset of time series data in the chart in a vertical or horizontal corresponding direction such that points of the first plot and the second plot along the corresponding direction represent the same point in time relative to the start of the respective first batch and second batch. Each link 202 as represented by data in a database may have a link type defined by the database ontology used by the database.

Figure 3:
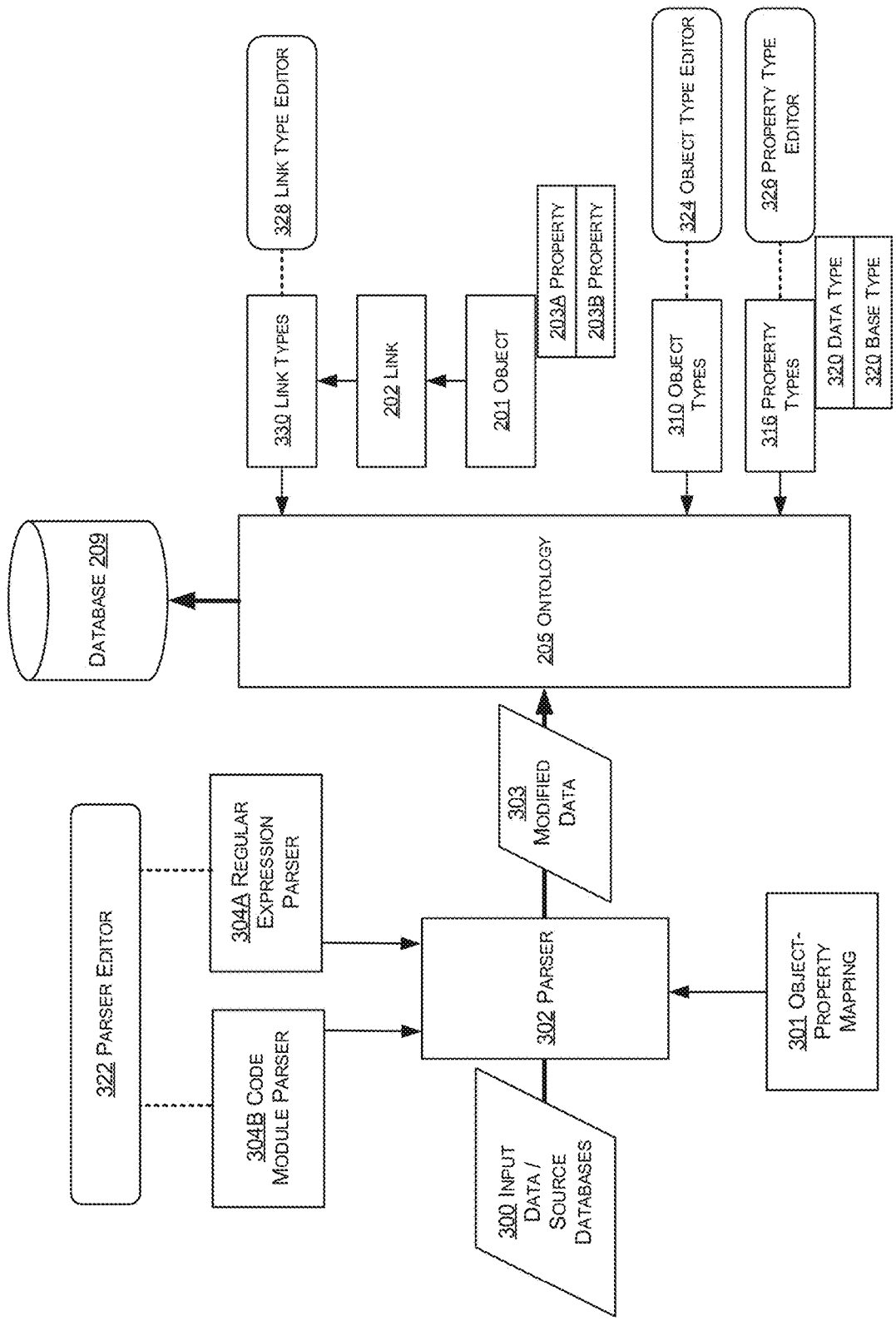
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. In another example, a system performing a process may be in communication with one or more databases with information about sensors that monitor the process and phases of the process. The databases may contain a variety of related information and attributes of each type of data, for example, related to multiple sensors that collect data during the process, phases of the process, data sensed by a sensor, time stamps of sensor data, and corresponding information related to the process or particular phases of the process. The parser 302 is able to read a variety of source input data types and determine which type of data it is reading.

In accordance with the discussion above, the example ontology 205 comprises stored information providing the data model of data for storage of data in database 209. The ontology 205 stored information provides a data model having one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 426 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

A user interface may show relationships between data objects. Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, a user interface may allow various other manipulations. For example, the objects within a database 209 may be searched using a search interface (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations.

Advantageously, the present disclosure allows users to interact and analyze electronic data in a more analytically useful way. Graphical user interfaces allow the user to visualize otherwise difficult to define relationships and patterns between different data objects. In the example of a system performing a process numerous times and being in communication with one or more databases with information about sensors that monitor the process and phases of the process, a graphical user interface can display time series sensor data of one or more sensors for corresponding times in selected processes at selected times to compare the sensor data from process to process. That is, the time series sensor data for two or more processes can be displayed in a plot in a relative time scale such that the data at the beginning of each plot is aligned to be at the same point in the process to help identify differences in the processes. Such time series sensor data has been parsed and stored in one or more data objects with properties and relationships as defined by an ontology. This allows a user, through the user interface, to quickly and easily select for display in one or more plots aligned time series sensor data of certain sensors, processes (or batches), systems etc., and at a desired scale/time period of the displayed. The present disclosure allows for easier comparison of time series data that was generated at times, and/or in different systems. The present disclosure also allows faster analysis of time series data by allowing quick and accurate access to selected portions of time series sensor data which may have been collected by different sensors in different systems, or the same sensors of the same system but during different processes of a repetitively run process. Without using the present disclosure, quickly selecting, displaying, and analyzing time series data, and making use of known relationships associated with time series data, would be virtually impossible given the size and diversity of many users' present databases, (e.g. excel spreadsheets, emails, and word documents).

Figure 4:
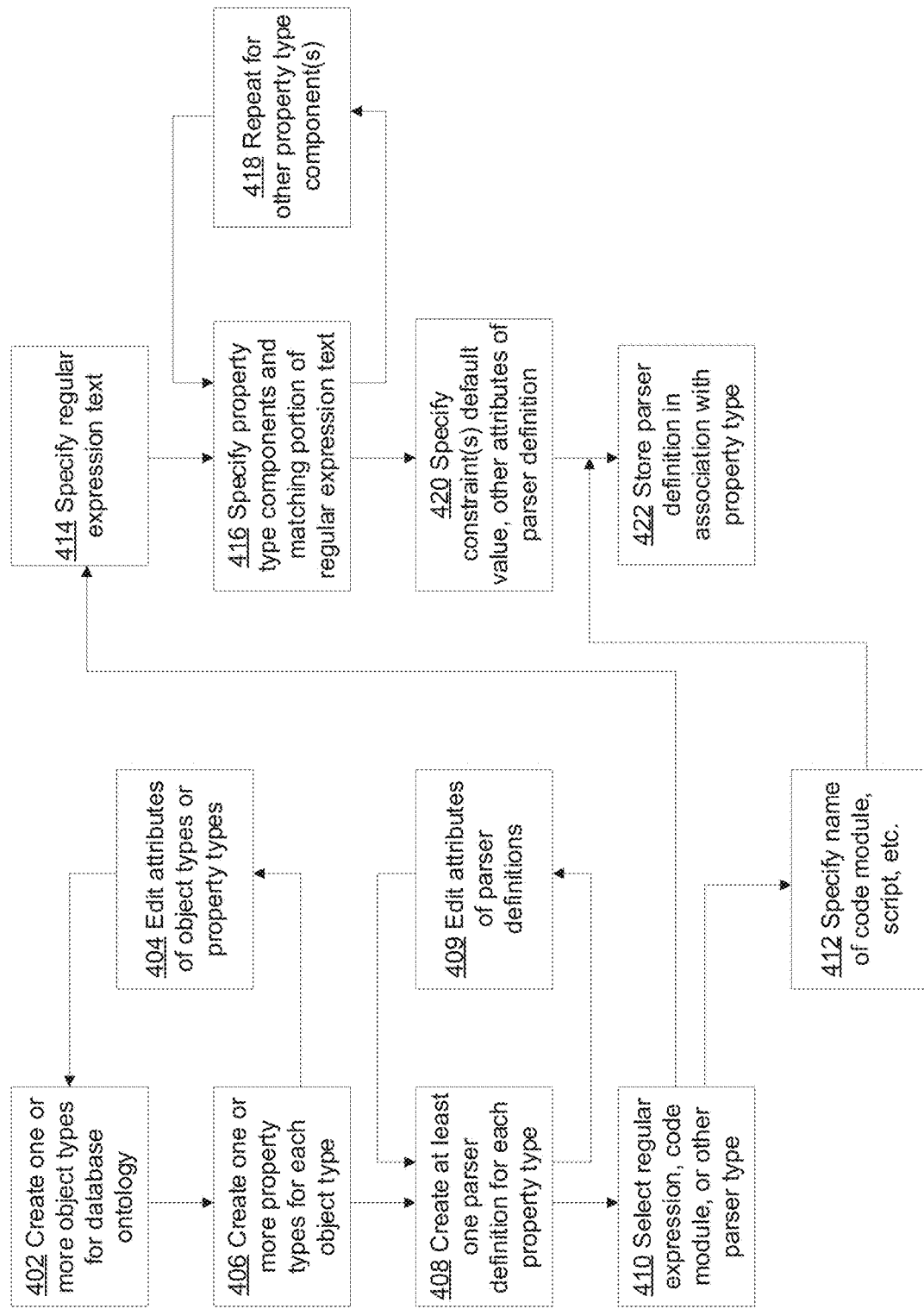
FIG. 4 illustrates defining a dynamic ontology for use in creating data in a data store.

FIG. 4 illustrates defining a dynamic ontology for use in creating data in a database. For purposes of disclosing a clear example, operations that may be used to define a dynamic ontology are illustrated in blocks 402-409 of FIG. 4, and are first described at a high level, and details of an example implementation follow the high level description. Although the operations may be referred to herein as "steps," (e.g., steps 402, 404, 406, etc.), unless indicated otherwise, these operations may be performed multiple time, for example, as loops as illustrated in FIG. 4. Also, in an embodiment, these operations may be performed in a different order, and/or there may be fewer operations or less operations.

In step 402, one or more object types are created for a database ontology. In step 406, one or more property types are created for each object type. As indicated in step 404, the attributes of object types or property types of the ontology may be edited or modified at any time.

In step 408, at least one parser definition is created for each property type. At step 409, attributes of a parser definition may be edited or modified at any time.

In an embodiment, each property type is declared to be representative of one or more object types. A property type is representative of an object type when the property type is intuitively associated with the object type. For example, a property type of "Social Security Number" may be representative of an object type "Person" but not representative of an object type "Business."

In an embodiment, each property type has one or more components and a base type. In an embodiment, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane". An example parser definition specifies an association of input data to object property components as follows: {LAST_NAME}, {FIRST_NAME}→Name:Last, Name:First. In an embodiment, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane". The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

In an embodiment, administrative users use an administrative editor to create or edit object types and property types. In an embodiment, users use the administrative editor to specify parser definitions and to associate regular expressions, code modules or scripts with the parser definitions. In the administrative editor, a user can specify attributes and components of a property type. For example, in one embodiment a user specifies a graphical user interface icon that is associated with the property type and displayed in a user interface for selecting the property type. The user further specifies a parser definition that is associated with the property type and that can parse input data and map the input data to properties corresponding to the property type. The user further specifies a display format for the property type indicating how users will see properties of that property type.

In an embodiment, an object type editor panel could comprise graphical buttons for selecting add, delete, and edit functions, and one or more rows that identify object types and a summary of selected attributes of the object types. Example selected attributes that can be displayed in object editor panel include an object type name (e.g., Business, Asset, etc.), a uniform resource identifier (URI) specifying a location of information defining the object type (for example, "com. business_entity_name.object.business"), and a base type of the object type, also expressed in URI format (for example, "com. business_entity_name.object.entity"). Each URI also may include a graphical icon.

In an embodiment, a user interacts with a computer to perform the following steps to define an object type. Assume for purposes of an example that the new object type is Batch. Using the object type editor, the user selects the "Add Object Type" button and the computer generates and displays a panel that prompts the user to enter values for a new object type. The user selects a base object type of Entity, which may comprise any person, place or thing. The user assigns a graphical icon to the Batch object type. The user assigns a display name of "Batch" to the object type.

In an embodiment, a user interacts with the computer to define a property type in a similar manner. For example, the user specifies a name for the property type, a display name, and an icon. The user may specify one or more validators for a property type. Each validator may comprise a regular expression that input data modified by a parser must match to constitute valid data for that property type. In an embodiment, each validator is applied to input data before a process can store the modified input data in an object property of the associated property type. Validators are applied after parsing and before input data is allowed to be stored in an object property.

In various embodiments, validators may comprise regular expressions, a set of fixed values, or a code module. For example, a property type that is a number may have a validator comprising a regular expression that matches digits 0 to 9. As another example, a property type that is a US state may have a validator that comprises the set {AK, AL, CA . . . VA} of valid two-letter postal abbreviations for states. Validator sets may be extendible to allow a user to add further values. A property type may have component elements, and each component element may have a different validator. For example, a property type of "Address" may comprise as components "City", "State", and "ZIP", each of which may have a different validator.

In an embodiment, defining a property type includes identifying one or more associated words for the property type. The associated words support search functions in large database systems. For example, a property type of "Address" may have an associated word of "home" so that a search in the system for "home" properties will yield "Address" as one result.

In an embodiment, defining a property type includes identifying a display formatter for the property type. A display formatter specifies how to print or display a property type value.

In an embodiment, the parser definitions each include a regular expression that matches valid input, and the parser uses a regular expression processing module. For example, conventional Java language processors typically have regular expression processing modules built in. In an embodiment, parser definitions comprising regular expressions may be chained together. In another embodiment, one or more of the parser definitions each include a code module that contains logic for parsing input data and determining whether the input data matches a specified syntax or data model. The code module may be written in Java, JavaScript, or any other suitable source language.

In an embodiment, there may be any number of parser definitions and sub-definitions. The number of parser definitions is unimportant because the input data is applied successively to each parser definition until a match occurs. When a match occurs, the input data is mapped using the parser sub definitions to one or more components of an instance of an object property. As a result, input data can vary syntactically from a desired syntax but correct data values are mapped into correct object property values in a database.

Accordingly, referring again to FIG. 4, creating a parser definition for a property type at step 408 may comprise selecting a parser type such as a regular expression, code module, or other parser type. When the parser type is "code module," then a user specifies the name of a particular code module, script, or other functional element that can perform parsing for the associated property type.

In an embodiment, defining a property type includes creating a definition of a parser for the property type using a parser editor. In an embodiment, a screen display comprises a Parser Type combo box that can receive a user selection of a parser type, such as "Regular Expression" or "Code Module." A screen display may further comprises a Name text entry box that can receive a user-specified name for the parser definition.

When the parser type is "regular expression," steps 414-420 are performed. At step 414, regular expression text is specified. For example, when the Parser Type value of combo box is "Regular Expression," a screen display comprises an Expression Pattern text box that can receive a user entry of regular expression pattern text.

In step 416, a property type component and a matching sub-definition of regular expression text is specified. For example, a screen display further comprises one or more property type component mappings. Each property type component mapping associates a sub-definition of the regular expression pattern text with the property type component that is shown in a combo box. A user specifies a property type component by selecting a property type component using a combo box for an associated sub-definition. As shown in step 518, specifying a property type component and sub-definition of regular expression text may be repeated for all other property type components of a particular property type.

In step 420, a user may specify one or more constraints, default values, and/or other attributes of a parser definition. The user also may specify that a match to a particular property type component is not required by checking a "Not Required" check box. A screen display may further comprise a Default Value text box that can receive user input for a default value for the property type component. If a Default Value is specified, then the associated property type receives that value if no match occurs for associated grouping of the regular expression. In alternative embodiments, other constraints may be specified.

At step 422, the parser definition is stored in association with a property type. For example, selecting the SAVE button causes storing a parser definition based on the values entered in screen display. Parser definitions may be stored in database 209.

The approach of FIG. 4 may be implemented using other mechanisms for creating and specifying the values and elements identified in FIG. 4, and a particular GUI of is not required.

Advantageously, use of a dynamic ontology may allow a user to take advantage of an ontological data model, while not constraining himself or herself to a hard-coded ontology. Hard-coded ontologies can be overly simple (i.e., lacking detailed semantic properties, making classification difficult but limiting analysis) or overly complex (i.e., having overly detailed semantic properties, making classification difficult). Use of a dynamic ontology can allow a user to define the desired level of semantic granularity, making dynamic ontologies suitable for a plurality of different and diverse uses (e.g., fraud prevention, cyber security, governmental applications, capital markets, etc.).

Advantageously, use of a parser or other ontology configuration tools may allow greater scalability of a user's database without loss of any analytic ability. Use of a parser or other ontology configuration tools and parser definitions, (e.g., first name, last name, etc.), may allow for self-categorization without the need for manual coding. Manual coding of a data object's properties may be subject to many of the disadvantages associated with manual data entry (e.g., slow, inaccurate, and costly). Additionally, manual coding of a data object's properties may not allow for dynamic ontology reconfiguration if a user chose to adjust the granularity, (i.e., specificity), or an ontologies semantic properties.

Certain methods can be used to transform data and create the data in a database using a dynamic ontology. In one example, input data is received. In an embodiment, an input data file is received. The input data file may comprise a comma-separated value (CSV) file, a spreadsheet, XML or other input data file format. Input data 300 of FIG. 3 may represent such file formats or any other form of input data.

An object type associated with input data rows of the input data may be identified, and one or more property types associated with input data fields of the input data are identified. Then, a row of data is read from the input data, and one or more field values are identified based on delimiters or other field identifiers in the input data. A set of parser definitions associated with the property type of a particular input data field may be selected. For example, metadata stored as part of creating a property type specifies a set of parser definitions, as previously described. The next parser definition can be applied to an input data field value. Thus, data fields are read from each row of the file and matched to each parser that has been defined for the corresponding property types. For example, assume that the mapping indicates that an input data CSV file comprises (Last Name, First Name) values for Name properties of Person objects. Data fields are read from the input data CSV file and compared to each of the parsers that has been defined for the Name property type given the First Name field and Last Name field. If a match occurs for a (Last Name, First Name) pair value to any of the parsers for the Name property type, then the parser transforms the input data pair of (Last Name, First Name) into modified input data to be stored in an instantiation of a Name property.

If applying a definition at results in a match to the input data, a property instance is created, and the input data field value is stored in a property of the property type associated with the matching sub-definition of the parser definition. For example, assume that the input data matches the regular expression for an ADDRESS value. The mapping specifies how to store the data matching each grouping of the regular expression into a component of the ADDRESS property. In response, an instance of an ADDRESS property is created in computer memory and the matching modified input data value is stored in each component of the property instance.

If no match occurs, then a test may be performed to determine whether other parser definitions match the same input data value. As an example, a property editing wizard in which multiple parsers have been created for a particular property, each of the multiple parsers can be used in matching input data. If no match occurs to the given parser definition, then any other parser definitions for that property type are matched until either no match occurs, or no other parser definitions are available.

If a grouping is empty, then the component is filled by the default value for that component, if it exists. If no other parser definitions are available, then an error is raised or the property is discarded. These preceding steps are repeated for all other values and rows in the input data until the process has transformed all the input data into properties in memory. After these steps are repeated for all other input data fields and rows, an object of the correct object type is instantiated. For example, the object-property mapping 301 may specify an object type for particular input data, and that type of object is instantiated. The newly created object is associated in memory with the properties that are already in memory. The resulting object is stored in the database.

Steps in the preceding process may be organized in a pipeline. Using the approaches herein, a user can self-define a database ontology and use automated, machine-based techniques to transform input data according to user-defined parsers and store the transformed data in the database according to the ontology. The approach provides efficient movement of data into a database according to an ontology. The input data has improved intelligibility after transformation because the data is stored in a canonical ontology. Further, the approach is flexible and adaptable, because the user can modify the ontology at any time and is not tied to a fixed ontology. The user also can define multiple parsers to result in semantic matches to input data even when the syntax of the input data is variable.

In various implementations, data objects in ontology 205 stored in database 209, may be stored as graphs or graph-like relationships (which may comprise data structures or databases), referred to collectively as "graphs." Some examples of graphs include an undirected graph, clusters, and adjacency lists that allow storing of graphs in memory efficiently, particularly where the graphs are lightly-connected graphs or clusters (e.g. graphs or clusters wherein the number of nodes is high compared to the number of linkages per node). Adjacency matrices may also allow for more efficient access and processing, particularly vectorized access and processing (e.g. using specialized hardware or processor instructions for matrix math), to the graph or cluster data because each matrix row corresponding to a node may have the same size irrespective of the number of linkages by node. As described here, various data items may be stored, processed, analyzed, etc. via graph-related data structures, which may provide various storage and processing efficiency advantages described. For example, advantages of graph-related data structures may include: built to handle high volume, highly connected data; efficient in computing relationship queries than traditional databases, either using adjacency matrices, or adjacency lists; can easily add to the existing structure without endangering current functionality; structure and schema of a graph model can easily flex; new data types and its relationship; evolves in step with the rest of the application and any changing business data requirements; can easily add weights to edges; can use optimal amount of computer memory, etc.

The nodes of a graph may represent different information or data objects, for example. The edges of the graph may represent relationships between the nodes. The ontology may be created or updated in various ways, including those described herein, comprising both manual and automatic processes. In some implementations, the ontology and or data objects in the graph database may be created and/or interacted with visually through various graphical user interfaces. Advantageously, this allows the user to interact with the data objects by placing, dragging, linking and deleting visual entities on a graphical user interface. The ontology may be converted to a low-level (i.e. node list) representation.

By defining data objects to have certain links and properties, and adding information to these data objects and defining links and properties of the data objects, the time series information associated with multiple batches that are each monitored by multiple sensors during multiple events can be organized and stored for later use. A user interface can then be used to quickly and efficiently access specific portions of the time series data and plot the data for display on a user interface. For example, the data objects can be used to determine from time series data of a first sensor, a first subset of time series data for a first batch from a desired first start time to a first end time. The data objects can also be used to determine, from time series data of the first sensor, a second subset of time series data for the second batch from a second start time to a second end time. This determine data can then be used to generate a time series user interface comprising a chart, the chart comprising a first plot for the first subset of time series data and a second plot for the second subset of time series data, wherein the first plot is aligned to the second plot such that the data can be compared, and the generated user interface can be displayed.

Figure 5:
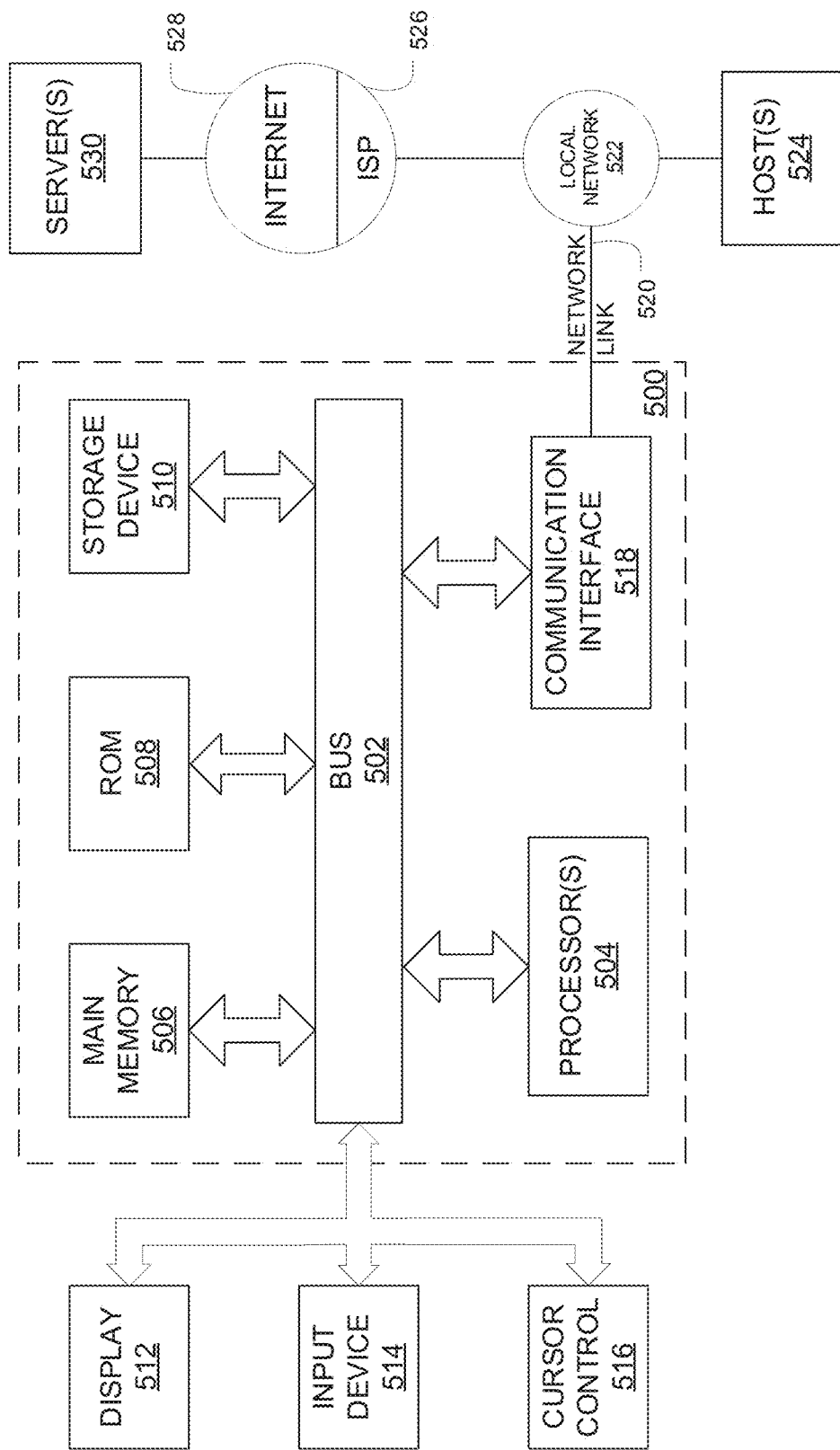
FIG. 5 is an example of an embodiment of a computer system that can implement the embodiments described herein.

FIG. 5 is a block diagram that illustrates a computer system 500 upon which various embodiments may be implemented. Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The main memory 506 may, for example, include instructions to allow a user to manipulate time series data to store the time series data in data objects as defined by an ontology, as described in reference to FIGS. 2-5.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more computer readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

Various forms of computer readable storage media may be involved in carrying one or more sequences of one or more computer readable program instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicate with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Accordingly, in some embodiments, of the computer system 500, the computer system comprises a first non-transitory computer storage medium storage device 510 configured to at least store for a plurality of batches, (i) first time series object data comprising a first start time and a first end time for a first batch, and (ii) second time series object data comprising a second start time and a second end time for a second batch. The computer system 500 can further comprise a second non-transitory computer storage medium main memory 506 configured to at least store computer-executable instructions. The computer system can further comprise one or more computer hardware processors 504 in communication with the second non-transitory computer storage medium main memory 506, the one or more computer hardware processors 504 configured to execute the computer-executable instructions to at least: determine, from time series data from a first sensor, a first subset of time series data for the first batch from the first start time and the first end time; determine, from the time series data from the first sensor, a second subset of time series data for the second batch from the second start time and the second end time; generate a time series user interface comprising a chart, the chart comprising a first plot for at least a portion of the first subset of time series data and a second plot for at least a portion of the second subset of time series data, wherein the first plot is temporally aligned to the second plot; and cause presentation of the time series user interface on the display 512. The plots may be temporally aligned, for example, such that they are graphically aligned. Either the first plot or the second plot may be shown in the chart as shifted in time so that they may begin at a same relative time in the chart. For example, the temporal alignment of the first plot to the second plot may align the portion of the first subset of time series data with the portion of the second subset of time series data in the chart in a vertical or horizontal corresponding direction such that points of the first plot and the second plot along the corresponding direction represent the same point in time relative to the start of the respective first batch and second batch.

The computer system 500 can include many other aspects. In an embodiment, the one or more computer hardware processors 504 of the computer system 500 are further configured to execute the computer-executable instructions to receive and store user input plot display range data for at least one of the first plot and the second plot, and in response to receiving the user data, from user input device 514, generate a time series user interface including a chart using the user input plot display range data, the chart including a first plot for the first subset of time series data and a second plot for the second subset of time series data, wherein the first plot is aligned to the second plot, wherein the user input display range data indicates a period of time. In another example, the one or more computer hardware processors 504 of the computer system 500 are further configured to execute the computer-executable instructions to determine, from time series data from a plurality of sensors, a corresponding number of one or more additional subsets of time series data for the first batch from the first start time and the first end time of the first batch, determine, from the time series data from the plurality of sensors, a corresponding number of one or more additional subsets of time series data for the second batch from the second start time and the second end time of the second batch, and cause presentation of the time series user interface. The chart may further include one or more additional plots corresponding to the one or more additional subsets of time series data, wherein the one or more additional plots are also aligned and comparable to the first plot and the second plot. As described in reference to FIGS. 2-5, the one or more computer hardware processors 504 may be configured to execute the computer-executable instructions to generate a user interface for defining an object model to store the first time series object data and the second time series object data.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
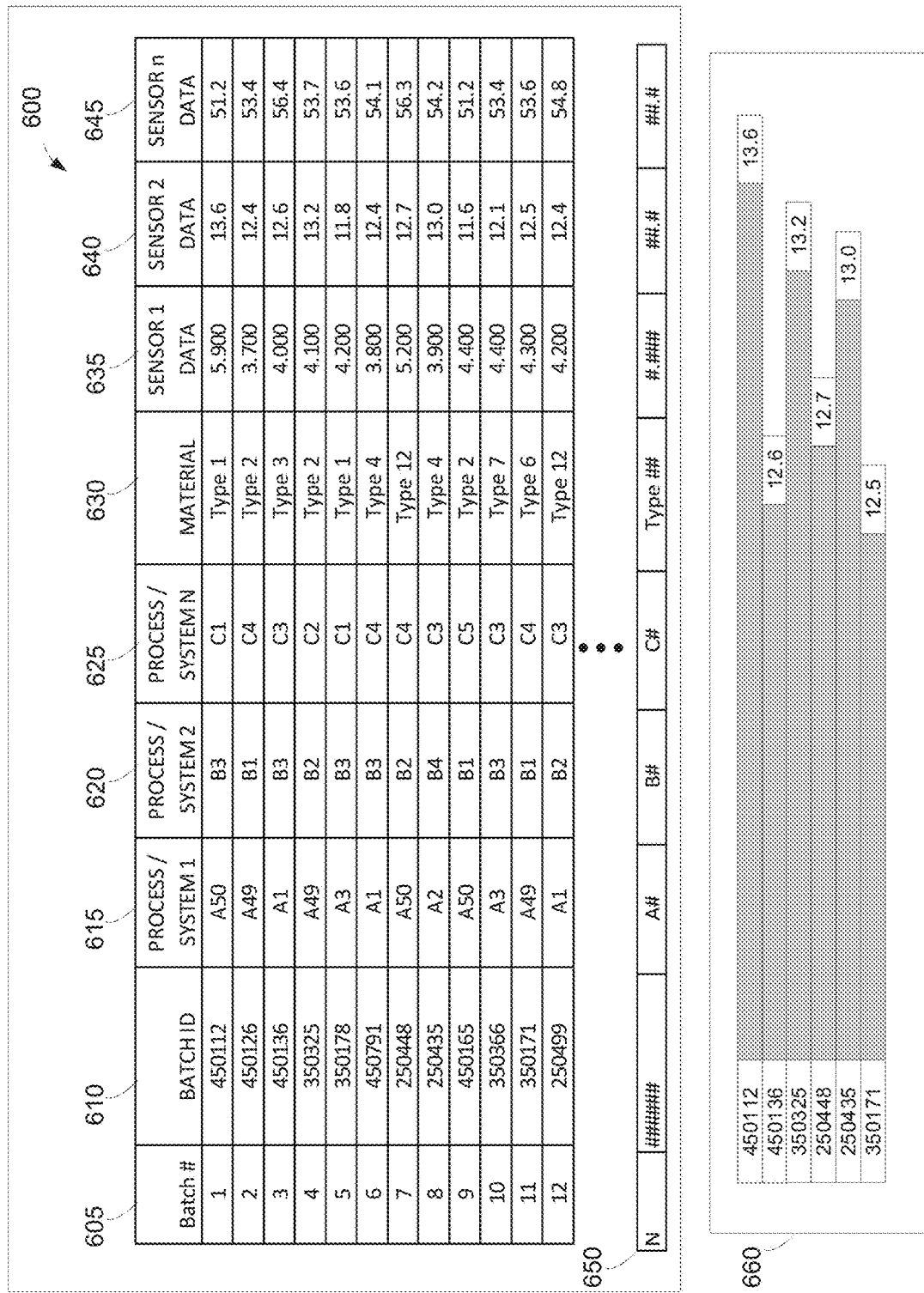
FIG. 6 illustrates an example of summary information of an initial data set of a plurality of batches.

FIG. 6 illustrates an example of summary information 600 of an initial data set of a plurality of batches on a board user interface, and illustrates an example of a graph 660 of at least some of the initial data set that may be generated to help select batches for a filtered data set. The board user interface illustrated in FIGS. 6-8 this allow a user to filter down and select batches that they want to investigate further. The initial data set of the plurality of batches may include several, dozens or hundreds of batches, or more. The batches in initial data set may have had a similar process that occurred on the same system, or on different systems. The summary information 600 presented in FIG. 6 is a representation of summary information. Actual summary information that is associated with a plurality of batches depends, of course, on the particular batches, the events and processes associated with the batches, the sensors used to collect time series data for the batches, and any other information (e.g., quality information) that is associated with the batches. The summary information 600 in this example shows 12 batches but fewer or more may be displayed, as indicated by row 650. The summary information 600 is an example of batch information of an initial data set that may be generated and displayed to a user is a step in investigating or analyzing time series data generated by a plurality of batches.

The summary information 600 illustrated in FIG. 6 is shown in a table format and is one example of how information of a plurality of batches may be displayed in a user interface, such as a board user interface. Other ways of presenting the summary information 600 are also contemplated. In this example, summary information 600 includes a column 605 listing the number batches from one to N, the summary information for each batch listed along a row of the table. The summary information 600 also includes a column 610 indicating a Batch Identifier, a column 615 indicating a first Process or system, column 620 indicating a second Process or system, in column 625 indicating other processes or systems. In this example each process or system may relate to an event that occurred for the indicated batch. In some examples, the events relate to a portion of a system that is monitoring a batch during a particular time. In one example, where the batch is a vehicle moving to a particular route, an event may be a particular part of the route, as defined by specific geographic area, or by a split specific time. Also, if the batch is a vehicle, an event may relate to a certain portion of the vehicle thus defining one or more sensors that may be located in the certain portion of the vehicle to capture time series data relating to the event. For example, the event may be a braking operation of the vehicle and sensors monitor characteristics of the braking operation for example heat, pressure, rotational speed, movement of braking mechanisms, noise, etc. also if the event is a braking operation of a vehicle, the event may take place in more than one location of the vehicle. In other words during the braking operation event sensor data may be collected from multiple locations on the vehicle, for example, at each wheel and at control components for the braking operation.

For batches related to production of a material, each process or system may relate to a certain operation that occurs during the production of the material, for example, heating the material, cooling the material, stirring the material, mixing the material, and subjecting the material to have one or more physical changes. In one example, the batch is a cake and during the baking process the cake is baked in a first oven for a particular time and a second oven for particular time, two events for this batch may be the places the cake is located during baking, that is, the first oven and the second oven. Thus, the processor system may be referenced by a certain part of a system that operates to perform a physical change to the material.

In the example illustrated in FIG. 6, the summary information 600 also includes a column 630 indicating a material type associated with a BATCH ID (e.g., as illustrated in the same row). The summary information 600 also includes columns 635, 640 and 645 of metrics that are associated with a BATCH ID. The metrics associated with a BATCH ID may be a quality indicator for a property that is important in the process (and thus a "metric" may be referred to herein as a "quality indicator"). The metric may indicate value or a property that is important in a process the batch is undergoing, for example, at the end of the process. In some examples, the metric may indicate a moisture content, pH, temperature, concentration of a substance, or any other sensed and/or determined property of the batch.

The example illustrated in FIG. 6 shows metrics for several sensors, e.g., a column 635 of sensor 1 data, a column 640 of sensor 2 data, and a column 645 of sensor n data. In this case, the metric may represent a property determined by sensor 1, sensor 2, and sensor n and thus may indicate to a user certain BATCH ID's and certain properties that may be desired for further evaluation by viewing time series data collected by certain sensors for those certain BATCH ID's, to provide insight into how the metric was arrived at for one or more particular BATCH ID's. For example, the metric (or quality indicator) may represent a "snapshot" of the time series data. In some examples, the quality indicator may be a sensor value for the batch when it has completed a particular part of the process, or the whole process. In some embodiments, the metric may be a particular point in a batch (for example, at the end of the processing of a batch, or at a predetermined point in a process) having a data value that may represents time series data collected by sensor, or a determined value derived from one or more sensors. Although the metric may be a single value as illustrated in FIG. 6, the quality indicator may correspond with time series data of the BATCH ID. For example, the metric 5.900 in column 635 associated with BATCH ID 450112 may correspond with time series data collected by a sensor 1 during a process (e.g., metric 5.900 may be a final value for a monitored property). Similarly, the metric 13.6 in column 640 and the metric 51.2 in column 645 are also associated with BATCH ID 450112 and may correspond with time series data collected by a sensor 2 and a sensor n during a process. Such metrics may be used to determine which time series data should be reviewed to provide insight into how the metric was generated.

Figure 7:
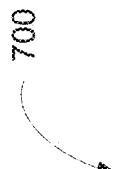
FIG. 7 illustrates an example of filtered summary information for three batches, this filtered data set being the result of filtering the initial data set of the plurality of batches in accordance with at least one criteria, for example at least one filtering parameter provided by a user.

The initial data set of batches may be very large such that visual analysis of all the batches by a user is unwieldy if not impossible. Accordingly, a user may filter the initial data set to determine selected batches to analyze. In some embodiment, the data may be filtered based on one or more of the metrics (quality indicators). For example, as a way to determine which of the batch information should be further analyzed, a board 660 in the board user interface may graph at least a portion of the summary information 600. Graphing the summary information may allow a user to visually perceive outlier quality indicators thus indicating one or more batch data sets that the user may want to investigate, for example, by viewing time series sensor data associated with the outliers. In this example, a histogram was generated by filtering the batches in the initial data, set such that batches having a Sensor 2 metric of 12.5 or greater is depicted in the histogram, which is illustrated in the board user interface 660. In this case the histogram includes six batches. Viewing this data, the user may decide to further investigate certain time series data for only some of these batches, for example, the batches having a Sensor 2 metric of 13.0 or greater. As illustrated in FIG. 7, the initial data set can then be filtered to create a filtered data set having these batches.

FIG. 7 illustrates an example of information relating to a filtered data set 700 for three batches (e.g., the three batches illustrated in the board user interface 660), this filtered data set 700 being the result of filtering the initial data set of the plurality of batches in accordance with at least one criteria, for example at least one filtering parameter provided by a user. In this example, the batches have been filtered such that a filtered data set includes batch number 1, batch number 4, and batch number 8, as depicted in the summary information 600.

The filtered data set 700 may be produced using a variety of filtering techniques. For example, in viewing the summary information 600 a user may see that sensor 2 data quality indicator shown in column 640 includes several higher values, for example, for batch 1, batch 4, and batch 8. In one example of filtering, to produce the filtered data set illustrated in FIG. 7, a user may select certain batches for the filtered data set (e.g., batches having a sensor 2 quality indicator of 13.0 or higher).

Accordingly, a user can filter an initial data set using information (e.g., metrics/quality indicators) related to certain time series data of the various batches to determine certain time series data for further evaluation. In this way, a user can look for batches that have certain high or low quality metric indicators, or other information indicative of a quality level or is otherwise interesting. For example, the summary information 600 may be filtered by specifying one or more filtering criteria to produce a filtered data set from time series data that includes batches with the highest sensor 2 data (for example, as illustrated in column 640 as being 13.0 or higher) by querying the database to determine which batches include information that meet the filtering criteria. In another example, filtering of initial data set may be performed by performing correlation analysis on data associated with each of the batches and stored in the database. In this way, outliers of quality indicators indicating exceptional batch data (for example, high-quality or low-quality batches) can be identified and appear in the filtered data set. In another example, quality metrics that are associated with each batch can be used as filtering criteria to produce the filtered data set 700. For example, a quality evaluation of the batch that occurs at the end of the batch, or that one or more stages during the batch, and is stored in the database, can be used to filter the initial data set to determine a filtered data set.

While FIGS. 6 and 7 illustrate example boards of a board user interface, the board user interface may enable a user to dynamically generate different boards to analyze batches. For example, using the board user interface, an analyst can import any initial data set. Various operations the user can perform using the board user interface include importing additional data to analyze, viewing the data in a tabular format, viewing the data in a graphical format (such as in a graph, scatterplot, bar chart, or other visual format), merging data (e.g., joining two data sets), filtering data sets, and so forth. Accordingly, an analyst can perform any number of operations to further analyze and filter the data to identify potential batches that may be viewed in a time series user interface described herein.

Figure 8:
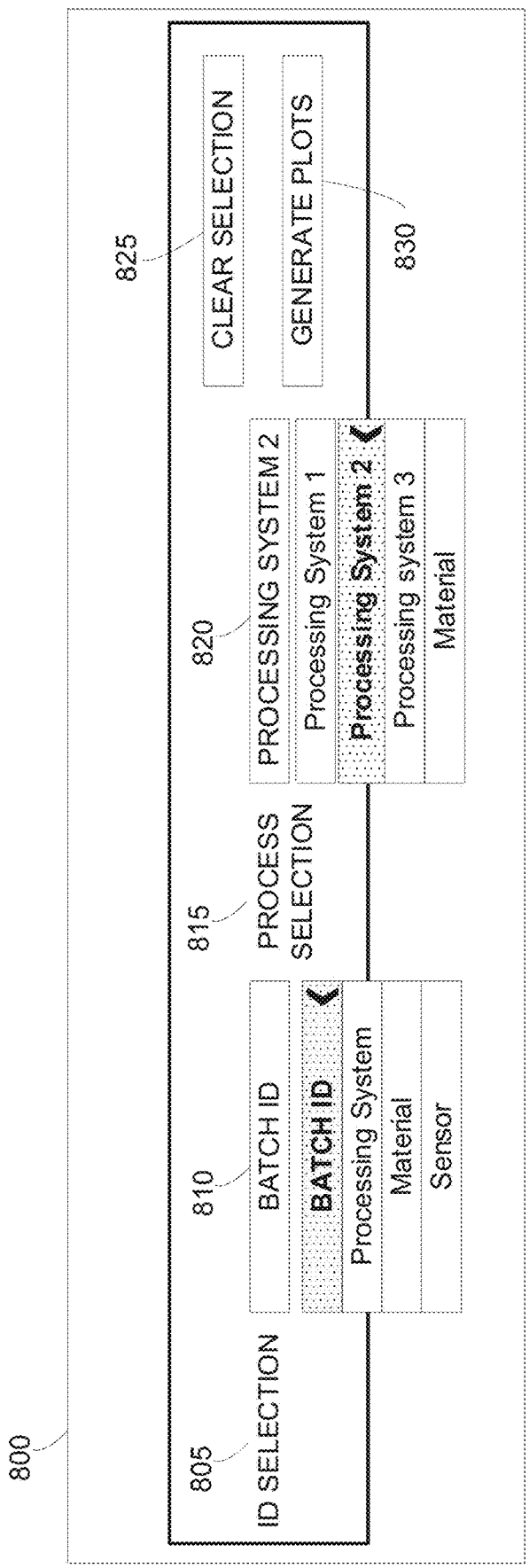
FIG. 8 illustrates an example of information that may be presented on a user interface to quickly and efficiently generate a user interface having a chart that includes plots of time series data of one or more sensors for multiple batches, the multiple batches being the filtered data set generated by filtering the initial data set.
Figure 9:
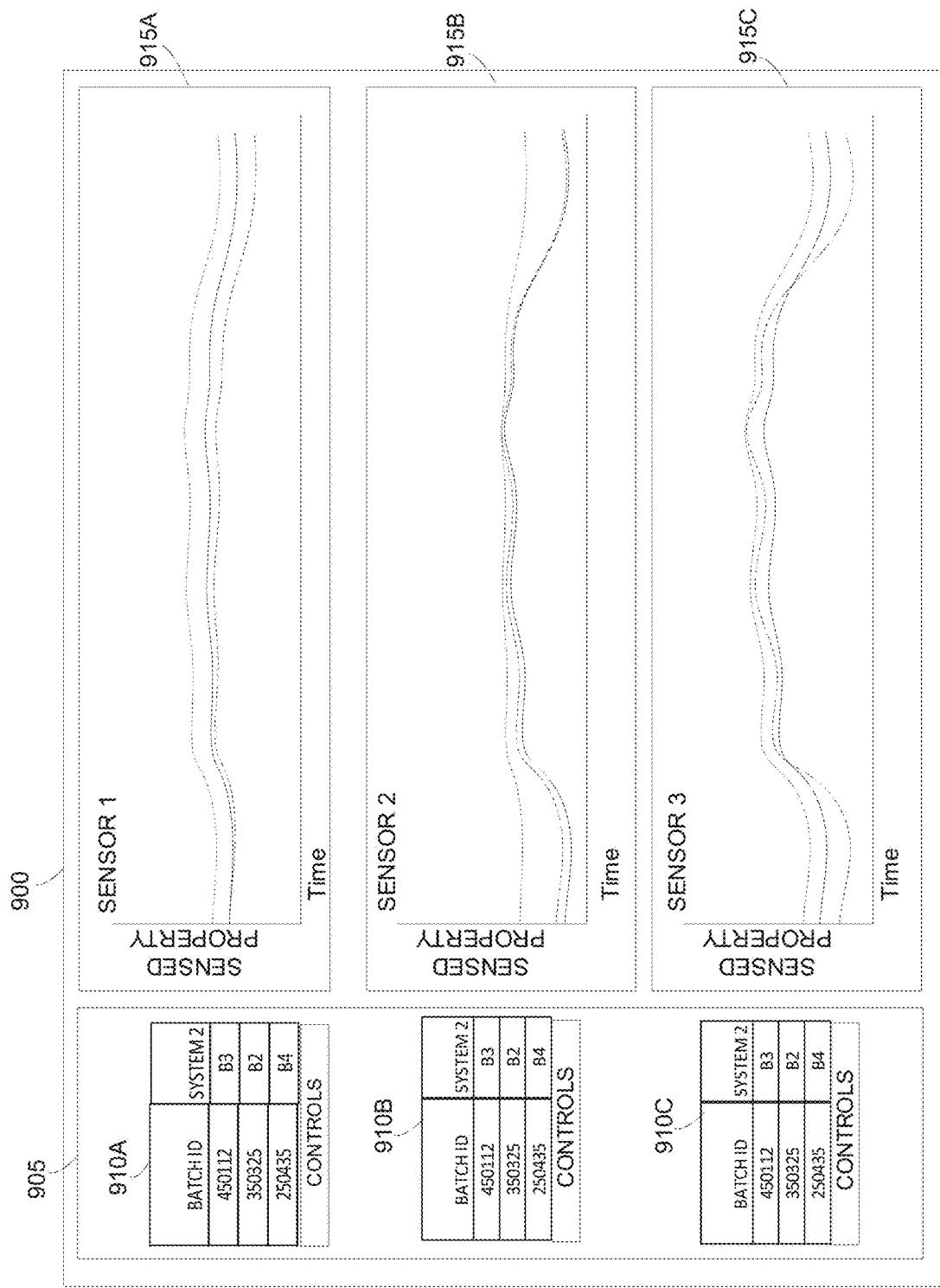
FIG. 9 is an example user interface that displays time series data from the filtered data set as a result of the selections made in the user interface illustrated in FIG. 8.

FIG. 8 illustrates an example of information that may be presented on a user interface 800 to quickly and efficiently generate another user interface, for example, user interface 900 illustrated in FIG. 9. Accordingly, FIG. 9 illustrates an example of the user interface 900 that is generated to display time series data from the filtered data set as a result of the selections made in the user interface depicted in FIG. 8. User interface 900 includes a chart having plots of time series data of one or more sensors for multiple batches that are in the filtered data set 700.

After the filtered data set 700 is determined, a user interface 800 can be generated and displayed for a user to select items to be graphically depicted in plots for analysis. In this example, the user interface 800 includes an identifier selection field 805 with a pulldown menu 810 that is used to identify a portion of the filtered data set for analysis. In the example illustrated in FIG. 8, the pulldown menu 810 is illustrated as selecting batch identifier from several other options. The selection identifier field 805 indicates items to be presented in a subsequent user interface for example, the user interface 900 illustrated in FIG. 9. In this example, user interface 900 includes a control panel 905 depicted in this example on the left side of user interface 900. User interface 900 also includes graphs 915A-C depicted on the right-hand side of the user interface 900. In this example, graphs 915A-C are presented such that each of their x-axis are parallel and depict time, and graphs 915A-C are aligned vertically such that the time series data shown in the graphs 915A-C can be aligned and compared. The control panel 905 may include individual control buttons 910A-C corresponding to each of the on graphs 915A-C to control the presentation of time series data on graphs 915A-C. As the batch identifier was selected in the identifier selection field 805, the three batches in the filtered data set 800 are correspondingly displayed in the control buttons 910A-C of the control panel 905. Various graphical controls may be used to best display the time series data, based on preferences of a user and based on the data being displayed.

The user interface 800 also includes a process selection field 815 with a pulldown menu 820 that is used to select a particular processing system or material of the batch for analysis. In this example, processing system 2 is selected. This example user interface 800 is configured to operate in conjunction with a previously generated filtered data set 700, and the time series data of the batches in the filtered data set that is stored in the database in accordance with an ontology. The user interface 800 is configured such that the identifier selection 805 and pulldown menu 810, and the process selection 815 and pulldown menu 820, indicates time series data that will be automatically retrieved and presented in a user interface, such as the user interface 900 in FIG. 9. In this way receiving a user selection can execute a process, referred to as a time series connector, for at least a first batch identifier and a second batch identifier and the selected batch process, where the time series connector is configured to generate time series configuration data related to the batch process selected. Once the batch process selection 820 has been made, a user can select a generate plot button 830 to cause the one or more processors to execute the time series connector. Executing a time series connector can comprise transmitting a request to a time series application, the request comprising the first batch identifier, the second batch identifier, any time series configuration data needed to generate the user interface depicting the selected batch identifiers and at least a portion of the time series data for the selected batch process. In this example, because the Processing aSystem 2 was selected in the process selection field 815, time series data that was collected and processing system to for the three batches indicated in the filtered data set 700 is plotted and displayed as illustrated in user interface 900 of FIG. 9. The user interface 800 also includes a clear selection button 825, which can be used to clear previously made entries to the user interface 800 such that new selections can be made.

The time series connector can generate the time series configuration data. For example, based on the user input received by the time series connector, the system can generate configuration data used by a time series user interface, such as the user interface 900 in FIG. 9. The configuration data can be in a Uniform Resource Indicator format (such as a Uniform Resource Locator), another data format such as XML or JavaScript Object Notation (JSON), and/or some combination thereof. In some embodiments, the configuration data can be stored in data storage, and the time series connector can transmit a message to a time series user interface to retrieve the configuration data from the data storage. The configuration data can be stored by an identifier, and the transmitted message to the time series user interface can include the identifier. Transmission of configuration data in this manner may efficiently transmit configuration data where the transmission messages may have data limits, such as in a web context where the time series user interface can be initiated or executed via a URI.

The time series configuration data can include parameters for the configuration of a time series user interface, such as the user interface 900 in FIG. 9. The time series configuration data can define each chart in a time series user interface and/or plot in a chart of the timer series user interface. For example, the time series configuration data can include a type, such as an ontology type, which indicates to the time series user interface to reference the data model to retrieve and present time series data according to the data model. The time series configuration data can include an indication for the time series user interface to use the start and stop time for a particular batch object (instead of having to include the actual start and stop time). For example, by including a batch identifier in the time series configuration data, the time series user interface can retrieve the batch object for the batch identifier that can include the particular start and stop time for the batch. Accordingly, the time series connector can control the configuration of a time series user interface (e.g., number of charts, number of plots per chart, and/or other timer series user interface configuration) via the via the provided time series configuration data.

Referring to FIG. 9, graph 915A illustrates time series sensor data generated in Processing System 2 by sensor 1 plotted for each of batch identifier 450112, 350325, and 250435. Graph 915B illustrates corresponding time series sensor data generated in Processing System 2 by sensor 2 that is plotted for each of batch identifier 450112, 350325, and 250435. And Graph 915C illustrates corresponding time series sensor data generated in Processing System 2 by sensor 3 that is plotted for each of batch identifier 450112, 350325, and 250435. The control panel 905 and individual controls 910 can allow time series sensor data for the indicated batches to be displayed in a variety of ways. In one example of a control panel 905, selection of a batch identifier from the individual control buttons 910 highlights time series data for the selected batch identifier making it easier to view. In another example of a control panel 905, a time range may be indicated which is then correspondingly plotted in graph 915. In one example, the time scale of the time series data in graphs 915 for each batch is the same. In another example, a user can specify different time scales to present the time series data, which may help to analyze the data.

The configuration user interface 800 uses known associations of groups of time series data, for example sensor data, with certain processing systems or certain material, to allow a user to quickly indicate time series data related to a process for display without having to know each sensor associated with the process and without having to manually indicate the data for each sensor to be displayed. The graphical user interface 800 is one example of a user interface that can be designed to implement associations of time series data that has been processed and stored as data objects with corresponding links and properties in accordance with an ontology, as described in reference to FIGS. 2 through 4.

A stated above, the graphical user interface 800 is an example of a user interface that is configured to take advantage of the underlying storage of data in accordance with an ontology, other graphical user interfaces with different pulldown menus that operate similarly are also contemplated. Using data objects that are stored on a computer storage medium, different time series user interfaces may be generated, each of the time series user interfaces including a chart illustrating plots of different portions of the time series data, for example, portions of time series data relating to one or more of various sensors, various batches, various events, various determined information, and/or various quality data. For example, other user interfaces can be configured such that the selection of a process (e.g., an event or a processing system), a material or particular type of sensor is used to generate a chart in a user interface that includes time series data associated with the selected process, material or sensor for multiple batches. Such user interfaces can facilitate easier analysis of large time series data sets because a user does not have to spend as much time indicating exactly what time series data needs to be presented in each plot. Instead, associations that have been generated when the time series data was processed in accordance with the ontology can be leveraged to display associated data of a process for multiple batches.

In various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Figure 10:
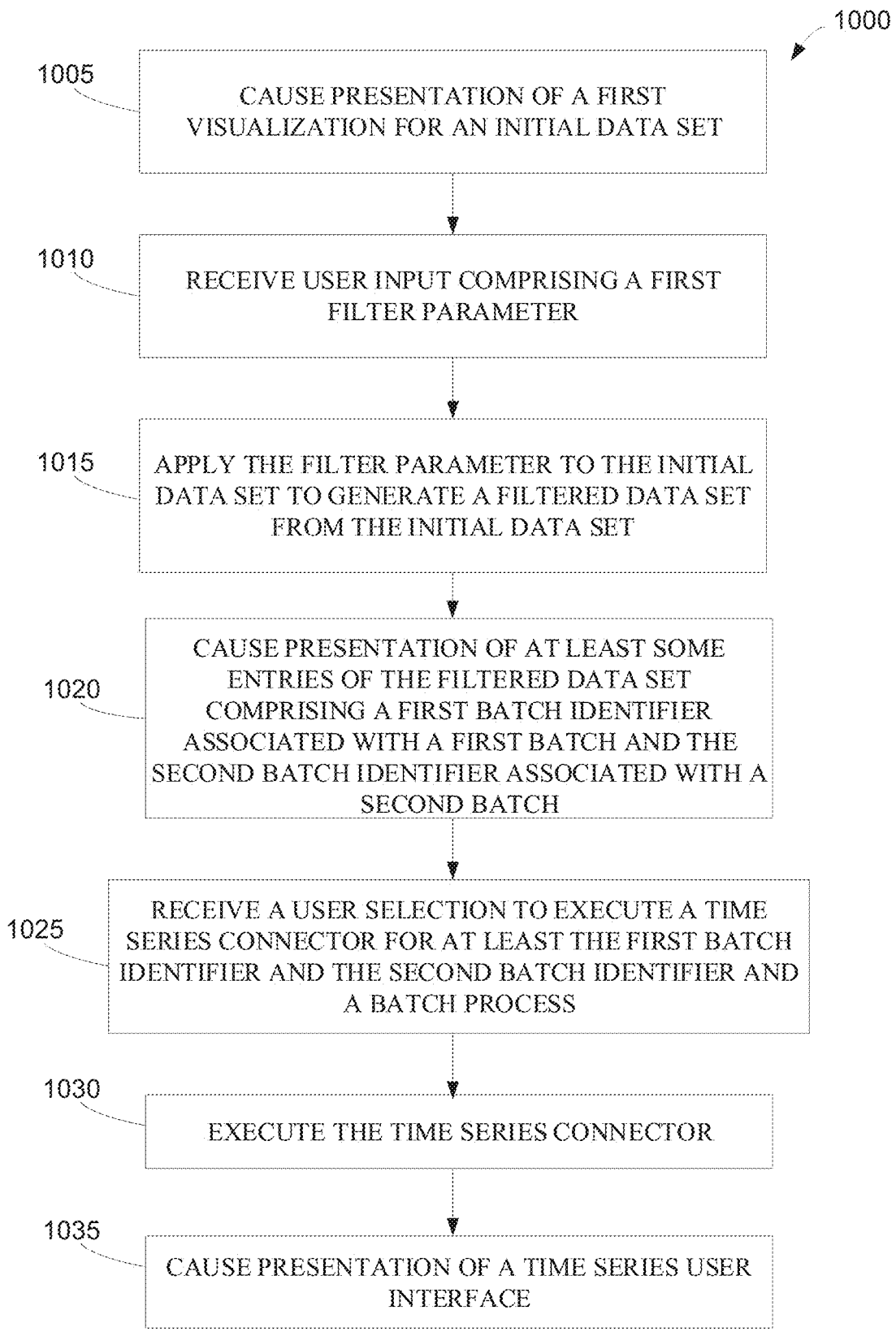
FIG. 10 is an example of a flowchart for presenting time series data in a user interface.

FIG. 10 is an example of a flowchart illustrating an embodiment of a process 1000 for presenting time series data in a user interface. The one or more processors 504 of the computer system 500 illustrated in FIG. 5 may perform the process 1000.

At block 1005, process 1000 causes presentation of a first visualization for an initial data set, the first visualization comprising summary information of a plurality of batches. The initial data set may include time series data associated with several, dozens, or even hundreds or more batches. The summary information may include various data and summaries of data for the plurality of batches, for example as indicated in the summary information 600 illustrated in FIG. 6. At block 1010, process 1000 receives user input including a first filter parameter. The first filter parameter may relate to data in the summary of information, for example, sensor information or data quality information. The first filter parameter may be received via input device 514 of the computer system 500.

At block 1015, process 1000 applies the first filter parameter to the initial data set, where applying the first filter parameter includes generating a filtered data set from the initial data set. The filtered data set is a subset of the initial data set. A purpose of filtering the initial data set to produce the first filtered data set is to reduce the number of selected batches for displaying graphically on a user interface. The filtered data set may include several batches for analysis. At block 1020, the process 1000 causes presentation of at least some entries of the filtered data set that may include, for example, a first batch identifier associated with a first batch and the second batch identifier associated with a second batch. FIG. 7 illustrates one example of a filtered data set 700.

At block 1030, the process 1000 receives a user selection to execute a time series connector. The time series connector is information that associates objects stored in a database, in accordance with the ontology. The purpose of the time series connector is to allow a user to select for display (e.g., using the user interface 800 illustrated in FIG. 8) time series sensor data stored in the database for particular batches and a particular process by merely identifying the particular batches and process. In one example, for each batch selected, the time series connector associates a start time and/or an end time for each batch, thus obviating the need for a user to manually determine the start time and/or end time for each selected batch. In another example, the time series connector associates a selected process with time series data stored in the database of one or more sensors that collect the data for the process, again, obviating the need for a user to manually determine the sensors that are associated with the selected process. Accordingly, implementation of the time series connector allows a user to select particular batch identifiers (e.g., by generating a filtered data set) and a particular process (e.g., using the process selection 815 pulldown menu 820 illustrated in FIG. 8) and time series data related to the batches and the process will be displayed, without the user having to manually determine and designate for display the start/end time for each batch, the corresponding start/end time for the selected process, and start/end time for the corresponding time series sensor data collected during the process.

The time series connectors may be configured based on information that has been stored in the database in accordance with an ontology. For example, as time series sensor data for a process is stored in a database in accordance with an ontology (for example, as discussed in reference to FIGS. 2-4, the process data object may be linked to the data object for the time series data for each sensor that monitors the process. Similarly, for a batch that is stored in the database in accordance with the ontology, the batch data object may be linked to a data object for each process in the batch. Accordingly, using this known association information, the time series connector may be configured such that when a certain process is selected (e.g., using the process selection 815 pulldown menu 820) and the system is directed to generate plots (e.g., using the generate plots 830 button) a particular time series connector is executed that is configured with information to access the time series sensor data relevant to the selected process between the start/end times related to the selected batches.

Accordingly, at block 1030, when the user selection is received by the process 1000, the process 1000 executes a time series connector for at least the first batch identifier, the second batch identifier and a batch process, where executing the time series connector comprises transmitting a request to a time series application, the request comprising the first batch identifier, the second batch identifier, and the time series configuration data. The process 1000 may receive the user selection via input device 514.

An example of receiving a user selection to execute a time series connector for at least the first batch identifier, the second batch identifier, and the batch process, illustrated in the user interface 800 illustrated in FIG. 8. In this example, a user selection is received and "Processing System 2" 820 is the batch process. The time series connector associates the batch identifiers of the filtered data set and the batch process "Processing System 2" with object information stored in the database, the object information comprising the start time for the batch process, the end time for the batch process, and time series sensor data for sensors that collected data for the batch process "Processing System 2." When the time series connector is executed, a request is transmitted to a time series application running on the one or more processors, the request including at least the first batch and the second batch identifier, and time series configuration data. The time series configuration data is information based on the time series connector that indicates time series data related to the first batch identifier and time series data related to the second batch identifier for presenting on a chart in a user interface.

At block 1035, the process 1000 causing presentation of a time series user interface based at least on the request, the time series user interface comprising a chart. The chart illustrate a first plot for first time series data of the first batch identifier and a second plot for second time series data of the second batch identifier, for example, as illustrated in graph 915A in FIG. 9. The chart is further configured according to the time series configuration data, and the first plot is aligned (e.g., temporally aligned) and comparable to the second plot. The time series configuration data refers to data that is automatically generated based on the user input to select a batch process for two or more batch identifiers. As in example, the time series configuration data may include information relating to producing the chart, for example, the range of the time scale on the x-axis of a graph in the chart showing time series data. In another example, the time series configuration data may include information indicting preferences for presenting the time series data in the chart, for example, previously determined preferences for a user.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method for presenting time series, the method comprising:
   storing data associated with a plurality of batches in a storage component and organized by an ontology, each batch relating to a different occurrence of a same type of event or process that is monitored by a system with a plurality of sensors over a time period;
   causing presentation of a first visualization for an initial data set, the first visualization comprising summary information of the plurality of batches;
   applying a first filter parameter to the initial data set, wherein applying the first filter parameter comprises generating a filtered data set from the initial data set;
   causing presentation of at least some entries of the filtered data set comprising a first batch identifier associated with a first batch and the second batch identifier associated with a second batch;
   receiving a user selection to execute a time series connector for at least the first batch identifier and the second batch identifier and a batch process, wherein the time series connector is configured to associate objects stored in accordance with the ontology and generate time series configuration data for stored batch data associated with the first batch identifier and the second batch identifier;
   executing the time series connector, wherein executing the time series connector further comprises:
   transmitting a request to a time series application, the request comprising the first batch identifier, the second batch identifier, and the time series configuration data; and
   causing presentation, in the time series application, of a time series user interface based at least on the request, the time series user interface comprising a chart, the chart comprising a first plot for first time series data for the first batch identifier and a second plot for second time series data for the second batch identifier, wherein the chart is further configured according to the time series configuration data, and wherein the first plot is aligned and comparable to the second plot, wherein the method is performed by one or more computer hardware processors configured to execute computer-executable instructions on a second non-transitory computer storage medium.

2. The method of claim 1, wherein the time series connector associates the batch process with object information stored in a database, the object information comprising the start time for the batch process, the end time for the batch process, and time series sensor data for at least one sensor that collected data for the batch process.

3. The method of claim 1, wherein the first time series data of the first plot is related to a first physical characteristic sensed from the first batch, and the second time series data of the second plot is related to the first physical characteristic sensed from the second batch.

4. The method of claim 3, wherein the chart further comprises a third plot for the first time series data for the first batch identifier, and a fourth plot for the second time series data for the second batch identifier, and wherein the first time series data of the third plot is related to a second physical characteristic sensed from the first batch, and the second time series data of the fourth plot is related to the second physical characteristic sensed from the second batch.

5. The method of claim 3, where the first plot and the second plot for the first physical characteristic are depicted in a first graph defined by an first x-axis and y-axis, and the third plot and the fourth plot for the second physical characteristic are depicted in a second graph defined by a second x-axis and y-axis, wherein the y-axis of the first graph and the second graph are illustrated to be in parallel in the chart.

6. The method of claim 1, wherein the summary information includes first information for each of the plurality of batches in the first visualization, and wherein applying the first filter parameter comprises generating the filtered data set from the initial data based on selecting batches of the plurality of batches having first information that meets the criteria of the first filter parameter.

7. The method of claim 1, wherein the user input comprises a second filter parameter, and wherein generating a filtered data set includes applying the second filter parameter to the filtered data set generated by applying the first filter parameter to generate a filtered data set filtered by the first and second filter parameter.

8. The method of claim 1, further comprising receiving a user input comprising a graphical parameter, applying the graphical parameter to the initial data set to generate a graphical summary representing at least some of the summary information for at least some of the plurality of batches, causing presentation of the graphical summary for analysis by the user.

9. The method of claim 8, wherein the graphical summary comprises a histogram.

10. The method of claim 8, wherein the graphical summary comprises a plot representing a correlation of at least some of the summary information for at least some of the plurality of batches.

11. The method of claim 1, wherein time series configuration data includes preconfigured information such that the presentation of a time series user interface based on the request causes the chart to include preconfigured time series data from multiple sensors for each batch represented in the chart.

12. A system for presenting time series, comprising:
   a first non-transitory computer storage medium configured to store time series data and summary information for a plurality of batches, and organized by an ontology, each batch relating to a different occurrence of a same type of event or process that is monitored by a system with a plurality of sensors over a period of time;
   a second non-transitory computer storage medium configured to at least store computer-executable instructions; and
   one or more computer hardware processors in communication with the second non-transitory computer storage medium, the one or more computer hardware processors configured to execute the computer-executable instructions to at least:

cause presentation of a first visualization for an initial data set, the first visualization comprising summary information of a plurality of batches;

apply a filter parameter to the initial data set, wherein applying the first filter parameter comprises generating a filtered data set from the initial data set;

cause presentation of at least some entries of the filtered data set comprising a first batch identifier associated with a first batch and the second batch identifier associated with a second batch;

receive a user selection to execute a time series connector for at least the first batch identifier and the second batch identifier and a batch process, wherein the time series connector is configured to associate objects stored in accordance with the ontology and to generate time series configuration data for stored batch data associated with the first batch identifier and the second batch identifier;

execute the time series connector, wherein executing the time series connector further comprises:

transmitting a request to a time series application, the request comprising the first batch identifier, the second batch identifier, and the time series configuration data; and cause presentation, in the time series application, of a time series user interface based at least on the request, the time series user interface comprising a chart, the chart comprising a first plot for first time series data for the first batch identifier and a second plot for second time series data for the second batch identifier, wherein the chart is further configured according to the time series configuration data, and wherein the first plot is aligned and comparable to the second plot.

13. The system of claim 12, wherein the first time series data of the first plot is related to a first physical characteristic sensed from the first batch, and the second time series data of the second plot is related to the first physical characteristic sensed from the second batch.

14. The system of claim 12, wherein the chart further comprises a third plot for the first time series data for the first batch identifier, and a fourth plot for the second time series data for the second batch identifier, and wherein the first time series data of the third plot is related to a second physical characteristic sensed from the first batch, and the second time series data of the fourth plot is related to the second physical characteristic sensed from the second batch.

15. The system of claim 12, where the first plot and the second plot for the first physical characteristic are depicted in a first graph defined by an first x-axis and a y-axis, and the third plot and the fourth plot for the second physical characteristic are depicted in a second graph defined by a second x-axis and y-axis, wherein the y-axes of the first graph and the second graph are illustrated to be in parallel in the chart.

16. The system of claim 12, wherein the user input comprises a second filter parameter, and wherein generating a filtered data set includes applying the second filter parameter to the filtered data set to generate a filtered data set filtered by the first and second filter parameter.

17. The system of claim 12, wherein the one or more computer hardware processors are further configured to execute the computer-executable instructions to receive a user input comprising a graphical parameter, apply the graphical parameter to the initial data set to generate a graphical summary representing at least some of the summary information for at least some of the plurality of batches, and cause presentation of the graphical summary.

18. The system of claim 17, wherein the graphical summary comprises a plot representing a correlation of at least some of the summary information for at least some of the plurality of batches.

19. The system of claim 12, wherein the time series connector comprises an association of a process that is related to a batch to time series sensor data for two or more sensors.

* * * * *